(12) United States Patent
Topolkaraev et al.

(10) Patent No.: US 9,957,369 B2
(45) Date of Patent: *May 1, 2018

(54) ANISOTROPIC POLYMERIC MATERIAL

(71) Applicant: Kimberly-Clark Worldwide, Inc., Neenah, WI (US)

(72) Inventors: Vasily A. Topolkaraev, Appleton, WI (US); Ryan J. McEneany, Appleton, WI (US); Neil T. Scholl, Neenah, WI (US); Mark M. Mleziva, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/909,575

(22) PCT Filed: Jun. 6, 2014

(86) PCT No.: PCT/IB2014/062035
§ 371 (c)(1),
(2) Date: Feb. 2, 2016

(87) PCT Pub. No.: WO2015/019201
PCT Pub. Date: Feb. 12, 2015

(65) Prior Publication Data
US 2016/0177048 A1 Jun. 23, 2016

Related U.S. Application Data

(60) Provisional application No. 61/863,929, filed on Aug. 9, 2013, provisional application No. 61/907,614, filed on Nov. 22, 2013.

(51) Int. Cl.
| | | |
|---|---|---|
| *C08J 9/36* | (2006.01) | |
| *C08J 9/35* | (2006.01) | |
| *B32B 27/12* | (2006.01) | |
| *C08J 3/22* | (2006.01) | |
| *C08J 5/18* | (2006.01) | |
| *C08L 67/04* | (2006.01) | |
| *B29C 44/04* | (2006.01) | |
| *B29C 44/22* | (2006.01) | |
| *B29C 44/34* | (2006.01) | |
| *C08J 3/20* | (2006.01) | |
| *B29K 67/00* | (2006.01) | |
| *B29K 105/16* | (2006.01) | |
| *B29K 105/00* | (2006.01) | |
| *B29L 7/00* | (2006.01) | |

(52) U.S. Cl.
CPC ............... *C08J 9/35* (2013.01); *B29C 44/04* (2013.01); *B29C 44/22* (2013.01); *B29C 44/3415* (2013.01); *B32B 27/12* (2013.01); *C08J 3/201* (2013.01); *C08J 3/226* (2013.01); *C08J 5/18* (2013.01); *C08L 67/04* (2013.01); *B29K 2067/046* (2013.01); *B29K 2105/16* (2013.01); *B29K 2105/256* (2013.01); *B29K 2423/08* (2013.01); *B29K 2423/14* (2013.01); *B29L 2007/002* (2013.01); *B29L 2007/008* (2013.01); *C08J 2367/04* (2013.01); *C08J 2423/12* (2013.01); *C08J 2423/14* (2013.01); *C08J 2433/14* (2013.01)

(58) Field of Classification Search
CPC ....... C08J 9/35; C08J 3/201; C08J 5/18; C08J 2367/04; C08J 2423/12; C08J 2423/14; C08J 2433/14; C08L 67/04; B29K 2067/046; B29K 2105/16; B29K 2105/256; B29K 2423/08; B29K 2423/24; B29L 2007/002; B29L 2007/008
See application file for complete search history.

(56) References Cited

U.S. PATENT DOCUMENTS

| | | |
|---|---|---|
| 3,338,992 A | 8/1967 | Kinney |
| 3,423,255 A | 1/1969 | Joyce |
| 3,692,618 A | 9/1972 | Dorschner et al. |
| 3,726,955 A | 4/1973 | Hughes et al. |
| 3,802,817 A | 4/1974 | Matsuki et al. |
| 3,855,046 A | 12/1974 | Hansen et al. |
| 4,041,203 A | 8/1977 | Brock et al. |

(Continued)

FOREIGN PATENT DOCUMENTS

| | | |
|---|---|---|
| WO | WO 2012/109144 A1 | 8/2012 |
| WO | WO 2012/155259 | 11/2012 |

OTHER PUBLICATIONS

Brad Jones et al,. Nanoporous Materials Derived from Polymeric Bicontinuous Microemulsions, Chemistry of Materials Communication, 3 pages, Jan. 6, 2010, vol. 22, pp. 1279-1281.
E.K. Patel et al., Nanosponge and Micro Sponges: A Novel Drug Delivery System, International Journal of Research in Pharmacy and Chemistry, 8 pages, 2012, vol. 2, No. 2, pp. 237-244.
Zhiwei Xie, et al., Electrospun Poly (D,L-lactide) Fibers for Drug Delivery: The Influence of Cosolvent and the Mechanism of Drug Release, Journal of Applied Polymer Science, 8 pages, 2010, vol. 22, pp. 1279-1281.
International Search Report and Written Opinion for PCT/IB2014/062035, dated Sep. 26, 2014, 14 pages.

*Primary Examiner* — Nathan M Nutter
(74) *Attorney, Agent, or Firm* — Dority & Manning, P.A.

(57) ABSTRACT

A polymeric material having anisotropic properties, such as mechanical properties (e.g., modulus of elasticity), thermal properties, barrier properties (e.g., breathability), and so forth, is provided. The anisotropic properties can be achieved for a single, monolithic polymeric material through selective control over the manner in which the material is formed. For example, one or more zones of the polymeric material can be strained to create a unique network of pores within the strained zone(s). However, zones of the polymeric material that are not subjected to the same degree of deformational strain will not have the same pore volume, and in some cases, may even lack a porous network altogether.

37 Claims, 11 Drawing Sheets

(56) References Cited

U.S. PATENT DOCUMENTS

| | | | |
|---|---|---|---|
| 4,055,702 | A | 10/1977 | Guthrie et al. |
| 4,100,324 | A | 7/1978 | Anderson et al. |
| 4,282,735 | A | 8/1981 | Break |
| 4,374,888 | A | 2/1983 | Bornslaeger |
| 4,375,718 | A | 3/1983 | Wadsworth et al. |
| 4,405,688 | A | 9/1983 | Lowery et al. |
| 4,557,132 | A | 12/1985 | Break |
| 4,592,815 | A | 6/1986 | Nakao |
| 4,698,372 | A | 10/1987 | Moss |
| 4,708,800 | A | 11/1987 | Ichikawa et al. |
| 4,741,944 | A | 5/1988 | Jackson et al. |
| 4,766,029 | A | 8/1988 | Brock et al. |
| 4,770,931 | A | 9/1988 | Pollock et al. |
| 4,789,592 | A | 12/1988 | Taniguchi et al. |
| 4,789,699 | A | 12/1988 | Kieffer et al. |
| 4,797,468 | A | 1/1989 | De Vries |
| 4,822,678 | A | 4/1989 | Brody et al. |
| 4,937,299 | A | 6/1990 | Ewen et al. |
| 4,983,450 | A | 1/1991 | Yanagihara et al. |
| D315,990 | S | 4/1991 | Blenke et al. |
| 5,030,404 | A | 7/1991 | Bonnebat et al. |
| 5,084,334 | A | 1/1992 | Hamano et al. |
| 5,169,706 | A | 12/1992 | Collier, IV et al. |
| 5,169,712 | A | 12/1992 | Tapp |
| 5,179,164 | A | 1/1993 | Lausberg et al. |
| 5,213,881 | A | 5/1993 | Timmons et al. |
| 5,218,071 | A | 6/1993 | Tsutsui et al. |
| 5,238,735 | A | 8/1993 | Nagou et al. |
| 5,252,642 | A | 10/1993 | Sinclair et al. |
| 5,272,236 | A | 12/1993 | Lai et al. |
| 5,278,272 | A | 1/1994 | Lai et al. |
| 5,284,703 | A | 2/1994 | Everhart et al. |
| 5,322,728 | A | 6/1994 | Davey et al. |
| 5,330,348 | A | 7/1994 | Aneja et al. |
| 5,336,552 | A | 8/1994 | Strack et al. |
| 5,350,624 | A | 9/1994 | Georger et al. |
| 5,382,400 | A | 1/1995 | Pike et al. |
| D358,035 | S | 5/1995 | Zander et al. |
| 5,422,377 | A | 6/1995 | Aubert |
| 5,464,688 | A | 11/1995 | Timmons et al. |
| 5,470,944 | A | 11/1995 | Bonsignore |
| 5,472,775 | A | 12/1995 | Obijeski et al. |
| 5,476,652 | A | 12/1995 | Chinuki et al. |
| 5,503,785 | A | 4/1996 | Crump et al. |
| 5,539,056 | A | 7/1996 | Yang et al. |
| 5,540,332 | A | 7/1996 | Kopacz et al. |
| 5,547,756 | A | 8/1996 | Kamo et al. |
| 5,571,619 | A | 11/1996 | McAlpin et al. |
| 5,596,052 | A | 1/1997 | Resconi et al. |
| 5,620,779 | A | 4/1997 | Levy et al. |
| 5,667,635 | A | 9/1997 | Win et al. |
| D384,508 | S | 10/1997 | Zander et al. |
| D384,819 | S | 10/1997 | Zander et al. |
| 5,695,868 | A | 12/1997 | McCormack |
| D390,708 | S | 2/1998 | Brown |
| 5,714,573 | A | 2/1998 | Randall et al. |
| 5,764,521 | A | 6/1998 | Batchelder et al. |
| 5,766,760 | A | 6/1998 | Tsai et al. |
| 5,770,682 | A | 6/1998 | Ohara et al. |
| 5,800,758 | A | 9/1998 | Topolkaraev et al. |
| 5,814,673 | A | 9/1998 | Khait |
| 5,821,327 | A | 10/1998 | Oota et al. |
| 5,843,057 | A | 12/1998 | McCormack |
| 5,855,999 | A | 1/1999 | McCormack |
| 5,880,254 | A | 3/1999 | Ohara et al. |
| 5,888,524 | A | 3/1999 | Cole |
| 5,931,823 | A | 8/1999 | Stokes et al. |
| 5,932,497 | A | 8/1999 | Morman et al. |
| 5,962,112 | A | 10/1999 | Haynes et al. |
| 5,968,643 | A | 10/1999 | Topolkaraev et al. |
| 5,997,981 | A | 12/1999 | McCormack et al. |
| 6,002,064 | A | 12/1999 | Kobylivker et al. |
| 6,004,124 | A | 12/1999 | Swanson et al. |
| D418,305 | S | 1/2000 | Zander et al. |
| 6,015,764 | A | 1/2000 | McCormack et al. |
| 6,028,018 | A | 2/2000 | Amundson et al. |
| 6,037,281 | A | 3/2000 | Mathis et al. |
| 6,057,024 | A | 5/2000 | Mleziva |
| 6,060,638 | A | 5/2000 | Paul et al. |
| 6,070,107 | A | 5/2000 | Lombardi et al. |
| 6,071,451 | A | 6/2000 | Wang et al. |
| D428,267 | S | 7/2000 | Romano, III et al. |
| 6,090,325 | A | 7/2000 | Wheat et al. |
| 6,093,665 | A | 7/2000 | Sayovitz et al. |
| 6,096,014 | A | 8/2000 | Haffner et al. |
| 6,150,002 | A | 11/2000 | Varona |
| 6,153,138 | A | 11/2000 | Helms, Jr. et al. |
| 6,197,237 | B1 | 3/2001 | Tsai et al. |
| 6,228,923 | B1 | 5/2001 | Lombardi et al. |
| 6,235,825 | B1 | 5/2001 | Yoshida et al. |
| 6,268,048 | B1 | 7/2001 | Topolkaraev et al. |
| 6,326,458 | B1 | 12/2001 | Gruber et al. |
| 6,337,198 | B1 | 1/2002 | Levene et al. |
| 6,348,258 | B1 | 2/2002 | Topolkaraev et al. |
| 6,389,864 | B1 | 5/2002 | Chubb et al. |
| 6,391,932 | B1 * | 5/2002 | Gore et al. .................. C08J 9/26 257/E23.077 |
| 6,431,477 | B1 | 8/2002 | Pallmann |
| 6,440,437 | B1 | 8/2002 | Krzysik et al. |
| 6,461,457 | B1 | 10/2002 | Taylor et al. |
| 6,479,003 | B1 | 11/2002 | Furgiuele et al. |
| 6,494,390 | B1 | 12/2002 | Khait et al. |
| 6,500,563 | B1 | 12/2002 | Datta et al. |
| 6,582,810 | B2 | 6/2003 | Heffelfinger |
| 6,660,211 | B2 | 12/2003 | Topolkaraev et al. |
| 6,713,175 | B1 | 3/2004 | Terada et al. |
| 6,790,403 | B1 | 9/2004 | Priedeman, Jr. et al. |
| 6,811,874 | B2 | 11/2004 | Tanaka et al. |
| 6,818,173 | B1 | 11/2004 | Khait |
| 6,824,680 | B2 | 11/2004 | Chandavasu et al. |
| 6,838,403 | B2 | 1/2005 | Tsai et al. |
| 6,905,759 | B2 | 6/2005 | Topolkaraev et al. |
| 6,914,018 | B1 | 7/2005 | Uitenbroek et al. |
| 6,923,634 | B2 | 8/2005 | Swanson et al. |
| 7,097,904 | B2 | 8/2006 | Ochi et al. |
| 7,122,246 | B2 | 10/2006 | Comb et al. |
| 7,141,168 | B2 | 11/2006 | Sakamoto et al. |
| 7,223,359 | B2 | 5/2007 | Torkelson et al. |
| 7,273,894 | B2 | 9/2007 | Shelby et al. |
| 7,354,973 | B2 | 4/2008 | Flexman |
| 7,368,503 | B2 | 5/2008 | Hale |
| 7,445,735 | B2 | 11/2008 | Miller et al. |
| 7,510,133 | B2 | 3/2009 | Pallmann |
| 7,604,470 | B2 | 10/2009 | LaBossiere et al. |
| 7,619,132 | B2 | 11/2009 | Topolkaraev et al. |
| 7,625,200 | B2 | 12/2009 | Leavitt |
| 7,754,807 | B2 | 7/2010 | Priedeman, Jr. et al. |
| 7,891,964 | B2 | 2/2011 | Skubic et al. |
| 7,910,041 | B1 | 3/2011 | Priedeman, Jr. |
| 7,914,891 | B2 | 3/2011 | Amundson et al. |
| 7,935,418 | B2 | 5/2011 | Koops et al. |
| 7,989,062 | B2 | 8/2011 | Chakravarty et al. |
| 8,076,406 | B2 | 12/2011 | Brule et al. |
| 8,268,738 | B2 | 9/2012 | McEneany et al. |
| 8,268,913 | B2 | 9/2012 | Li et al. |
| 8,287,677 | B2 | 10/2012 | Lake et al. |
| 8,323,837 | B2 | 12/2012 | Nishida et al. |
| 8,334,327 | B2 | 12/2012 | Kaufman et al. |
| 8,362,145 | B2 | 1/2013 | Li et al. |
| 8,372,917 | B2 | 2/2013 | Li et al. |
| 8,394,306 | B2 | 3/2013 | Nishida et al. |
| 8,410,215 | B2 | 4/2013 | Sano et al. |
| 8,444,905 | B2 | 5/2013 | Li et al. |
| 8,466,337 | B2 | 6/2013 | Wang et al. |
| 8,512,024 | B2 | 8/2013 | Pax |
| 8,530,577 | B2 | 9/2013 | Li et al. |
| 8,545,971 | B2 | 10/2013 | Li et al. |
| 8,586,192 | B2 | 11/2013 | Li et al. |
| 8,628,718 | B2 | 1/2014 | Li et al. |
| 8,637,130 | B2 | 1/2014 | Wang et al. |
| 8,658,069 | B2 | 2/2014 | Auffermann et al. |
| 8,684,739 | B2 | 4/2014 | Steffier et al. |
| 8,759,446 | B2 | 6/2014 | Li et al. |
| 8,936,740 | B2 | 1/2015 | Topolkaraev et al. |

(56) References Cited

U.S. PATENT DOCUMENTS

| | | |
|---|---|---|
| 8,980,964 B2 | 3/2015 | Topolkaraev et al. |
| 9,040,598 B2 | 5/2015 | Scholl et al. |
| 9,518,181 B2 | 12/2016 | Scholl et al. |
| 2002/0081423 A1 | 6/2002 | Heffelfinger |
| 2002/0122828 A1 | 9/2002 | Liu |
| 2003/0113528 A1 | 6/2003 | Moya |
| 2003/0180525 A1 | 9/2003 | Strack |
| 2004/0002273 A1 | 1/2004 | Fitting et al. |
| 2004/0078015 A1 | 4/2004 | Copat et al. |
| 2004/0170852 A1 | 9/2004 | Gustafson |
| 2005/0054255 A1 | 3/2005 | Morman et al. |
| 2005/0112363 A1 | 5/2005 | Ning |
| 2005/0119359 A1 | 6/2005 | Shelby et al. |
| 2005/0221075 A1 | 10/2005 | Travelute, III et al. |
| 2005/0260911 A1 | 11/2005 | Ochi et al. |
| 2006/0094810 A1 | 5/2006 | Kim et al. |
| 2006/0257656 A1 | 11/2006 | Ochi et al. |
| 2007/0264897 A1 | 11/2007 | Collias et al. |
| 2008/0095978 A1 | 4/2008 | Siqueira et al. |
| 2008/0147165 A1 | 6/2008 | Hossainy et al. |
| 2008/0150185 A1 | 6/2008 | Topolkaraev |
| 2008/0287026 A1 | 11/2008 | Chakravarty et al. |
| 2009/0068463 A1 | 3/2009 | Mochizuki et al. |
| 2009/0069463 A1 | 3/2009 | Serizawa et al. |
| 2009/0124956 A1 | 5/2009 | Swetlin et al. |
| 2009/0274871 A1 | 11/2009 | Takahashi et al. |
| 2009/0311937 A1 | 12/2009 | He et al. |
| 2009/0326152 A1 | 12/2009 | Li et al. |
| 2010/0003882 A1 | 1/2010 | Sumi et al. |
| 2010/0048082 A1 | 2/2010 | Topolkaraev |
| 2010/0056656 A1 | 3/2010 | Matsuoka et al. |
| 2010/0068484 A1 | 3/2010 | Kaufman |
| 2010/0093888 A1 | 4/2010 | Endo et al. |
| 2010/0112357 A1 | 5/2010 | Fine et al. |
| 2010/0121295 A1 | 5/2010 | Collias et al. |
| 2010/0143717 A1 | 6/2010 | Sakamoto et al. |
| 2010/0178477 A1 | 7/2010 | Jacobs |
| 2010/0304051 A1 | 12/2010 | Henschke et al. |
| 2011/0132519 A1 | 6/2011 | Li et al. |
| 2011/0183563 A1 | 7/2011 | Ochi et al. |
| 2011/0195210 A1 | 8/2011 | Li et al. |
| 2011/0212179 A1 | 9/2011 | Liu |
| 2011/0262683 A1 | 10/2011 | Mochizuki et al. |
| 2012/0040185 A1 | 2/2012 | Topolkaraev et al. |
| 2012/0040582 A1 | 2/2012 | Topolkaraev et al. |
| 2012/0164905 A1 | 6/2012 | Topolkaraev et al. |
| 2012/0214944 A1 | 8/2012 | Li et al. |
| 2012/0225272 A1 | 9/2012 | Costeux et al. |
| 2012/0231242 A1 | 9/2012 | Boyer et al. |
| 2012/0315454 A1 | 12/2012 | Wang et al. |
| 2012/0321856 A1 | 12/2012 | Afshari |
| 2013/0118981 A1 | 5/2013 | Vogel et al. |
| 2013/0209770 A1 | 8/2013 | Topolkaraev |
| 2013/0210308 A1 | 8/2013 | McEneany et al. |
| 2013/0210621 A1 | 8/2013 | Topolkaraev et al. |
| 2013/0210949 A1 | 8/2013 | Scholl et al. |
| 2013/0210983 A1 | 8/2013 | Topolkaraev et al. |
| 2014/0044954 A1 | 2/2014 | Matsubara et al. |
| 2014/0170922 A1 | 6/2014 | Porutheer et al. |
| 2015/0159012 A1 | 6/2015 | Topolkaraev et al. |
| 2016/0108194 A1 | 4/2016 | Topolkaraev et al. |
| 2016/0108564 A1 | 4/2016 | Topolkaraev et al. |
| 2016/0122491 A1 | 5/2016 | Topolkaraev et al. |
| 2016/0177048 A1 | 6/2016 | Topolkaraev et al. |
| 2016/0185929 A1* | 6/2016 | Topolkaraev et al. .............. B29C 55/005 521/134 |
| 2016/0193157 A1 | 7/2016 | Topolkaraev et al. |

* cited by examiner

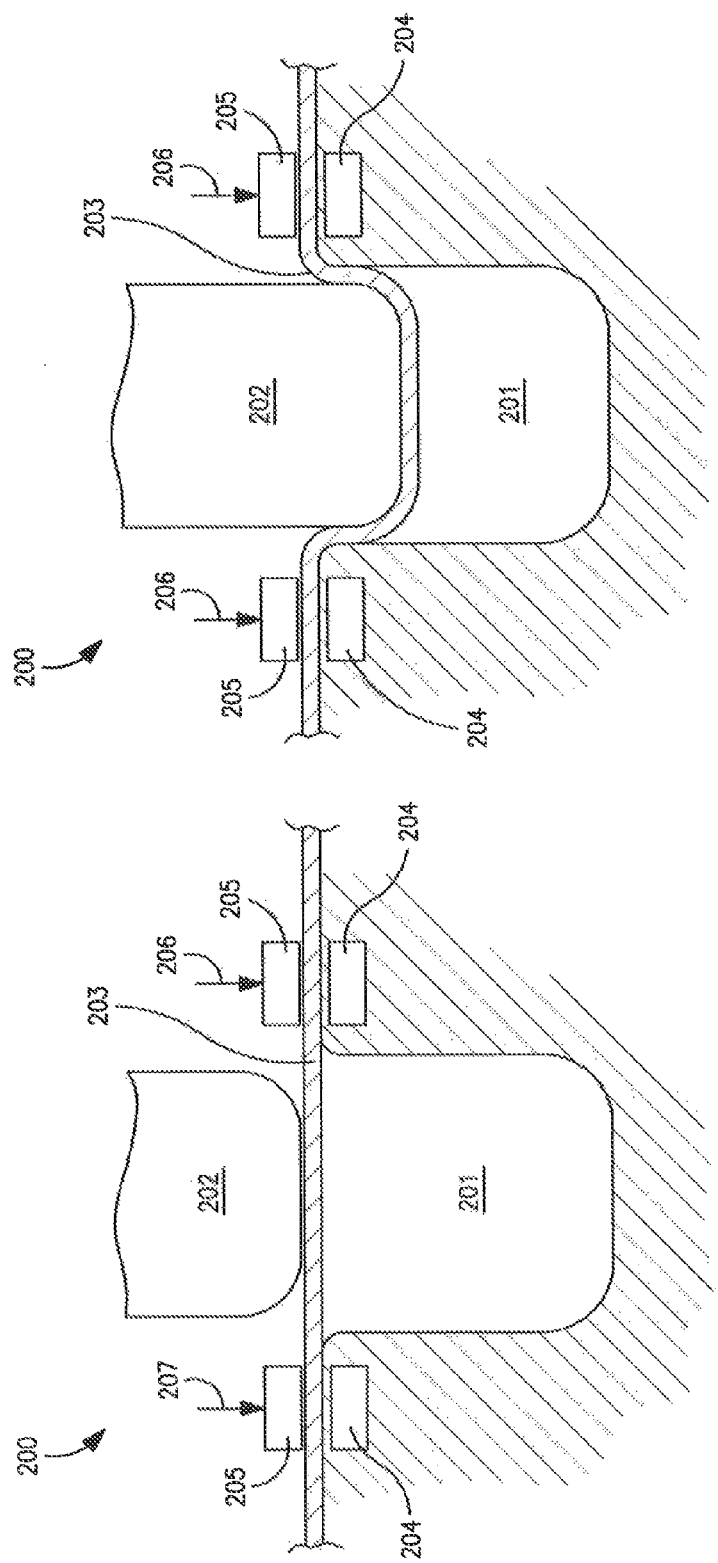

ANISOTROPIC POLYMERIC MATERIAL

RELATED APPLICATIONS

The present application is the national stage entry of International Patent Application no. PCT/IB2014/062035 having a filing date of Jun. 6, 2014, which claims priority to U.S. provisional application Ser. No. 61/863,929, filed on Aug. 9, 2013, and 61/907,614, filed on Nov. 22, 2013, which are incorporated herein in their entirety by reference thereto.

BACKGROUND OF THE INVENTION

Polymeric materials are routinely used in various articles to provide a certain degree of functionality (e.g., barrier properties, strength, thermal insulation, etc.) not easily achievable with other types of materials. One of the recurring problems with these traditional "high functionality" polymeric materials is that the target properties are typically isotropic throughout the material. Unfortunately, when the targeted functionality is only needed at certain locations of an article, the use of an isotropic polymeric material can adversely impact other properties. One industry in which the problem of highly functional, isotropic materials is particularly evident is the garment industry. For example, military and law enforcement personnel often have a need for highly functional polymeric materials that provide good thermal insulation and water barrier properties. While polymeric materials are certainly available that can achieve these properties, their isotropic nature can render them overly stiff and bulky. Another example in which the isotropic nature of polymeric material is problematic is in the building industry. For example, fluidic pipes are often formed from polymeric materials that are rigid in nature to provide strength and robustness over the life of the pipe. One of the common issues with these rigid materials, however, is that it is difficult to manipulate them into different shapes or directions as is often required during installation. With currently available components, the user must incorporate multiple pipe segments and connectors to create an angled pathway.

As such, a need currently exists for an anisotropic polymeric material that can be selectively provided with the desired functionality in those areas in which it is most needed.

SUMMARY OF THE INVENTION

In accordance with one embodiment of the present invention, a polymeric material is disclosed. The polymeric material is formed from a thermoplastic composition containing a continuous phase that includes a matrix polymer. A microinclusion additive and nanoinclusion additive are dispersed within the continuous phase in the form of discrete domains. The polymeric material defines a first zone that is contiguous to a second zone, wherein a porous network is formed within the first zone such that the first zone exhibits a greater pore volume than the second zone.

Other features and aspects of the present invention are discussed in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which:

FIGS. 3-4 illustrate one embodiment of a stamping device that may be employed to form the anisotropic material of the present invention, in which FIG. 3 shows the device prior to stamping and FIG. 4 shows the device after stamping;

Repeat use of references characters in the present specification and drawings is intended to represent same or analogous features or elements of the invention.

DETAILED DESCRIPTION OF REPRESENTATIVE EMBODIMENTS

Reference now will be made in detail to various embodiments of the invention, one or more examples of which are set forth below. Each example is provided by way of explanation of the invention, not limitation of the invention. In fact, it will be apparent to those skilled in the art that various modifications and variations may be made in the present invention without departing from the scope or spirit of the invention. For instance, features illustrated or described as part of one embodiment, may be used on another embodiment to yield a still further embodiment. Thus, it is intended that the present invention covers such modifications and variations as come within the scope of the appended claims and their equivalents.

Generally speaking, the present invention is directed to a polymeric material having anisotropic properties, such as mechanical properties (e.g., modulus of elasticity), thermal properties, barrier properties (e.g., breathability), and so forth. The anisotropic properties can be achieved for a single, monolithic polymeric material through selective control over the manner in which the material is formed. More particularly, the polymeric material is formed from a thermoplastic composition containing a continuous phase that includes a matrix polymer, microinclusion additive, and nanoinclusion additive. The additives may be selected so that they have a different elastic modulus than the matrix polymer. In this manner, the microinclusion and nanoinclusion additives can become dispersed within the continuous phase as discrete micro-scale and nano-scale phase domains, respectively. When subjected to a deformational strain, intensive localized shear regions and/or stress intensity regions (e.g., normal stresses) can form near the micro-scale discrete phase domains as a result of stress concentrations that arise from the incompatibility of the materials. These shear and/or stress intensity regions may cause some initial debonding in the polymer matrix adjacent to the micro-scale domains. Notably, however, localized shear and/or stress intensity regions may also be created near the nano-scale discrete phase domains that overlap with the micro-scale regions. Such overlapping shear and/or stress intensity regions cause even further debonding to occur in the polymer matrix, thereby creating a substantial number of nanopores adjacent to the nano-scale domains and/or micro-scale domains.

Figure 1:
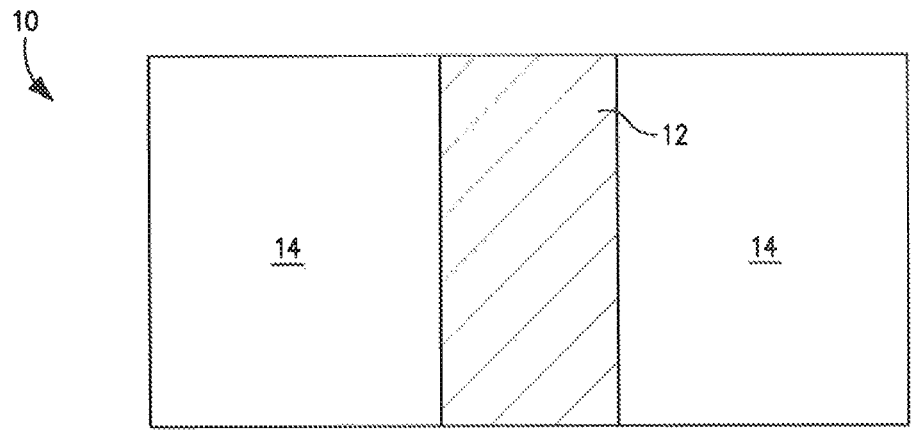
FIG. 1 schematically illustrates one embodiment of the anisotropic polymeric material of the present invention.
Figure 2:
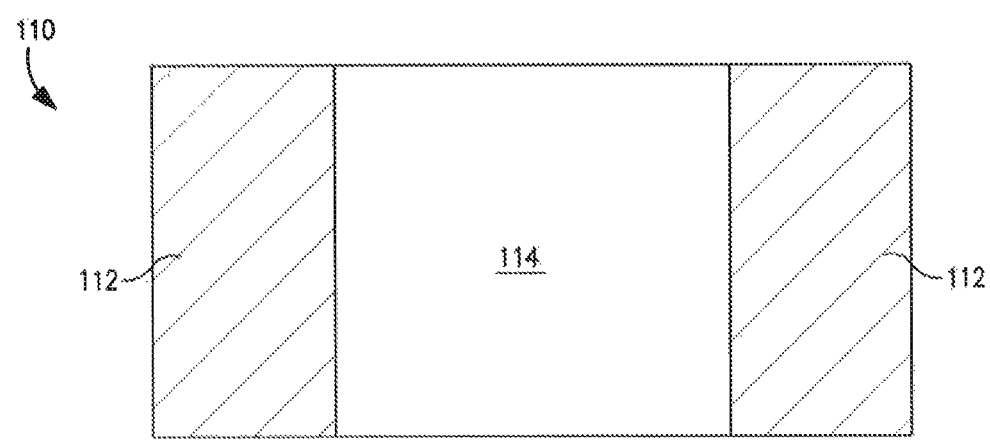
FIG. 2 schematically illustrates another embodiment of the anisotropic polymeric material of the present invention.

Through such a unique thermoplastic composition, the present inventors have discovered that one or more zones of the polymeric material can be strained to create a unique network of pores within the strained zone(s). However, zones of the polymeric material that are not subjected to the same degree of deformational strain will not have the same pore volume, and in some cases, may even lack a porous network altogether. In this manner, a polymeric material can be formed that contains multiple zones, one or more of which (e.g., "first zones") have a certain degree of porosity and one or more of which (e.g., "second zones") have a lesser degree of porosity. Typically, at least one of the first zones is contiguous to at least one of the second zones. Nevertheless, the particular configuration, shape, and/or size of the first and second zones are not critical and generally depend on the particular application and properties. For exemplary purposes only, FIG. 1 shows one particular embodiment of a polymeric material 10 in which a first zone 12 is disposed between and contiguous to second zones 14. FIG. 2 shows yet another embodiment of a polymeric material 110 in which a second zone 114 is disposed between and contiguous to first zones 112.

Regardless of the particular configuration, the average percent volume occupied by the pores within a given unit volume of the material in the first zone(s) is typically greater than that of the second zone(s). For example, the average pore volume within the first zone(s) may be about 15% to about 80% per cm$^3$, in some embodiments from about 20% to about 70%, and in some embodiments, from about 30% to about 60% per cubic centimeter of the material. Comparatively, the material within the second zone(s) may lack pores or at the very least have a low pore volume, such as less than 15%, and in some embodiments, from 0% to about 10%. Due to the porous network, the polymeric material within the first zone(s) may also have a relatively low density in comparison to the second zone(s), which can allow for selective portions of the material to be lighter. The ratio of the density within the first zone(s) to the density within the second zone(s) may be about 0.1 to about 0.95, in some embodiments from about 0.2 to about 0.9, and in some embodiments, from about 0.3 to about 0.8. For example, the density within the first zone(s) may be about 1.2 grams per cubic centimeter ("g/cm$^3$") or less, in some embodiments about 1.0 g/cm$^3$ or less, in some embodiments from about 0.2 g/cm$^3$ to about 0.8 g/cm$^3$, and in some embodiments, from about 0.1 g/cm$^3$ to about 0.5 g/cm$^3$, while the density within the second zone(s) may be greater than about 0.8 g/cm$^3$, in some embodiments greater than about 1.0 g/cm$^3$, and in some embodiments, greater than about 1.2 g/cm$^3$.

Due to the differing degrees of porosity that can be selectively achieved in the present invention, the resulting polymeric material can exhibit anisotropic properties within the first and second zones, which can allow for portions of the polymeric material to provide selective functionality at those locations where it is most needed. Of course, the nature of these properties and the degree to which they differ can vary depending on the desired use of the material.

In certain embodiments, for example, the first zone(s) may be generally permeable to water vapors as characterized by a relatively high water vapor transmission rate ("WVTR") in comparison to the second zone(s). The ratio of the WVTR within the first zone to the WVTR within the second zone may be about 0.1 to about 0.95, in some embodiments from about 0.2 to about 0.9, and in some embodiments, from about 0.3 to about 0.8. For example, the polymeric material within the first zone(s) may exhibit a WVTR of about 500 g/m$^2$-24 hours or more, in some embodiments about 1,000 g/m$^2$-24 hours or more, and in some embodiments, from about 3,000 to about 15,000 g/m$^2$-24 hours, while the WVTR within the second zone(s) may be less than 500 g/m$^2$-24 hours, such as determined in accordance with ASTM E96/96M-12, Procedure B or INDA Test Procedure IST-70.4 (01).

As indicated above, the overlapping shear and/or stress intensity regions created during straining can result in the formation of pores adjacent to the nano-scale domains and/or micro-scale domains. Due to the unique nature of the material and the manner in which it is formed, the pores may become distributed within alternating banded areas between which ridges of the polymer matrix are located that extend generally perpendicular to the direction of strain. The ridges can remain relatively uncavitated and stiff. However, the polymer matrix can also form bridges in the banded areas that remain relatively flexible in nature due to the high concentration of pores therein. The combination of these features can result in a material that has structural integrity due to the presence of the rigid ridges, yet also capable of flexing and dissipating energy due to the presence of the relatively flexible bridges. Among other things, this enhances the flexibility of the polymeric material within the first zone(s) and allows them, for instance, to selectively conform to the shape of a body part. The enhanced flexibility of the first zone(s) in comparison to the second zone(s) may be such that the ratio of the modulus within the first zone(s) to the modulus within the second zone(s) may be about 0.1 to about 0.95, in some embodiments from about 0.2 to about 0.9, and in some embodiments, from about 0.3 to about 0.8. For example, the first zone(s) may have a modulus of elasticity of about 2400 Megapascals ("MPa") or less, in some embodiments about 2200 MPa or less, in some embodiments from about 50 MPa to about 2000 MPa, and in some embodiments, from about 100 MPa to about 1000 MPa, while the modulus of elasticity within the second zone(s) may be greater than about 1000 MPa, in some embodiments greater than about 1500 MPa, and in some embodiments, greater than about 2400 MPa, such as determined in accordance with ASTM D638-10 at 23° C.

In addition to improving flexibility, the porous nature of the first zone(s) can also help to dissipate energy under load and increase impact strength at both low and high speed impacts. Without intending to be limited by theory, for example, it is believed that when subjected to a relatively low to medium impact force, a pressure wave may be created that propagates relatively slowly through the polymeric material. As the wave proceeds, the polymeric material may be reversibly compressed or deformed, and may thus cushion a body part during impact by absorbing a portion of the impact energy through internal deformation of the pore structure. During a high-speed impact, the force at the impact zone may be far greater and the resulting pressure wave may proceed much faster. The pressure wave can reach the outer boundary of the material much more quickly or from the time of impact. This can result in an internal pressure wave that occurs at a much higher pressure, leading to a much faster internal equilibrium at higher pressure. In addition, individual pores are compressed faster than they can relieve pressure by emptying it into adjacent cells. Thus, at high impact speeds, the polymeric material can be non-destructively compressed only as far as the porous structure can withstand the concomitantly increasing pressure of the compressed air within the pore volume. After the pressure limit is reached, further compression of the polymeric material requires destructive deformation of the porous structure similar to conventional rigid closed cell foams, except that the pores of the present invention can still recover their original shape. The sum of the above pressure effects is to make the first zone(s) rigid during a high-speed impact, but still capable of recovering a substantial proportion of its original shape.

In this regard, the polymeric material may selectively provide a high degree of impact strength. The material within the first zone(s) may, for instance, exhibit a relatively high notched Charpy impact strength in comparison to the second zone(s) such that the ratio of the impact strength within the first zone to the second zone may be about 0.1 to about 0.95, in some embodiments from about 0.2 to about 0.9, and in some embodiments, from about 0.3 to about 0.8. For example, the notched Charpy impact strength within the first zone(s) may be about 10 kilojoules per square meter ("kJ/m$^2$") or more, in some embodiments about 20 kJ/m$^2$ or more, in some embodiments about 35 kJ/m$^2$ or more, and in some embodiments, from about 45 kJ/m$^2$ to about 100 kJ/m$^2$, while the notched Charpy impact strength within the second zone(s) may be less than 10 kJ/m$^2$, as measured in accordance with ASTM D6110-10 at 23° C. While achieving the properties noted above, the present inventors have discovered that other mechanical properties may not be adversely affected. For example, the break stress within the first and second zones may remain within the range of from about 1 to about 80 MPa, and in some embodiments, from about 10 to about 65 MPa. In fact, in certain embodiments, the break stress within the first zone(s) can actually increase so that it is greater than that of the second zone(s).

A substantial portion of the pores within the first zone(s) may also be of a "nano-scale" size ("nanopores"), such as those having an average cross-sectional dimension of about 800 nanometers or less, in some embodiments from about 5 to about 250 nanometers, and in some embodiments, from about 10 to about 100 nanometers. The term "cross-sectional dimension" generally refers to a characteristic dimension (e.g., width or diameter) of a pore, which is substantially orthogonal to its major axis (e.g., length) and also typically substantially orthogonal to the direction of the stress applied during drawing. Such nanopores may, for example, constitute about 15 vol. % or more, in some embodiments about 20 vol. % or more, in some embodiments from about 30 vol. % to 100 vol. %, and in some embodiments, from about 40 vol. % to about 90 vol. % of the total pore volume in the polymeric material.

The presence of such a high degree of nanopores within the first zone(s) can even further enhance the anisotropic nature of the polymeric material. For example, the nanopores can substantially decrease thermal conductivity within the first zone(s) as fewer cell molecules are available within each pore to collide and transfer heat. The low thermal conductivity values may also occur at relatively low thicknesses, which can allow the material to possess a selectively greater degree of flexibility and conformability, as well as reduce the space it occupies in an article. For this reason, the polymeric material within the first zone(s) may exhibit a relatively low thermal admittance (thermal conductivity of the material divided by its thickness and is provided in units of watts per square meter-kelvins ("W/m$^2$K")) in comparison to the second zone(s) such that the ratio of the thermal admittance within the first zone to the second zone may be about 0.1 to about 0.95, in some embodiments from about 0.2 to about 0.9, and in some embodiments, from about 0.3 to about 0.8. For example, the material within the first zone(s) may exhibit a thermal admittance of about 1000 W/m$^2$K or less, in some embodiments from about 10 to about 800 W/m$^2$K, in some embodiments from about 20 to about 500 W/m$^2$K, and in some embodiments, from about 40 to about 200 W/m$^2$K, while the thermal admittance within the second zone(s) may be more than 1000 W/m$^2$K. The actual thickness of the polymeric material within the first and second zones may vary, but typically ranges from about 5 micrometers to about 100 millimeters, in some embodiments from about 10 micrometers to about 50 millimeters, in some embodiments from about 200 micrometers to about 25 millimeters, and in some embodiments, from about 50 micrometers to about 5 millimeters.

Various embodiments of the present invention will now be described in more detail.

I. Thermoplastic Composition

A. Matrix Polymer

As indicated above, the thermoplastic composition contains a continuous phase within which the microinclusion and nanoinclusion additives are dispersed. The continuous phase contains one or more matrix polymers, which typically constitute from about 60 wt. % to about 99 wt. %, in some embodiments from about 75 wt. % to about 98 wt. %, and in some embodiments, from about 80 wt. % to about 95 wt. % of the thermoplastic composition. The nature of the matrix polymer(s) used to form the continuous phase is not critical and any suitable polymer may generally be employed, such as polyesters, polyolefins, styrenic polymers, polyamides, etc. In certain embodiments, for example, polyesters may be employed in the composition to form the polymer matrix. Any of a variety of polyesters may generally be employed, such as aliphatic polyesters, such as polycaprolactone, polyesteramides, polylactic acid (PLA) and its copolymers, polyglycolic acid, polyalkylene carbonates (e.g., polyethylene carbonate), poly-3-hydroxybutyrate (PHB), poly-3-hydroxyvalerate (PHV), poly-3-hydroxybutyrate-co-4-hydroxybutyrate, poly-3-hydroxybutyrate-co-3-hydroxyvalerate copolymers (PHBV), poly-3-hydroxybutyrate-co-3-hydroxyhexanoate, poly-3-hydroxybutyrate-co-3-hydroxyoctanoate, poly-3-hydroxybutyrate-co-3-hydroxydecanoate, poly-3-hydroxybutyrate-co-3-hydroxyoctadecanoate, and succinate-based aliphatic polymers (e.g., polybutylene succinate, polybutylene succinate adipate, polyethylene succinate, etc.); aliphatic-aromatic copolyesters (e.g., polybutylene adipate terephthalate, polyethylene adipate terephthalate, polyethylene adipate isophthalate, polybutylene adipate isophthalate, etc.); aromatic polyesters (e.g., polyethylene terephthalate, polybutylene terephthalate, etc.); and so forth.

In certain cases, the thermoplastic composition may contain at least one polyester that is rigid in nature and thus has a relatively high glass transition temperature. For example, the glass transition temperature ("T$_g$") may be about 0° C. or more, in some embodiments from about 5° C. to about 100° C., in some embodiments from about 30° C. to about 80° C., and in some embodiments, from about 50° C. to about 75° C. The polyester may also have a melting temperature of from about 140° C. to about 300° C., in some embodiments from about 150° C. to about 250° C., and in some embodiments, from about 160° C. to about 220° C. The melting temperature may be determined using differential scanning calorimetry ("DSC") in accordance with ASTM D-3417. The glass transition temperature may be determined by dynamic mechanical analysis in accordance with ASTM E1640-09.

One particularly suitable rigid polyester is polylactic acid, which may generally be derived from monomer units of any isomer of lactic acid, such as levorotory-lactic acid ("L-lactic acid"), dextrorotatory-lactic acid ("D-lactic acid"), meso-lactic acid, or mixtures thereof. Monomer units may also be formed from anhydrides of any isomer of lactic acid, including L-lactide, D-lactide, meso-lactide, or mixtures thereof. Cyclic dimers of such lactic acids and/or lactides may also be employed. Any known polymerization method, such as polycondensation or ring-opening polymerization, may be used to polymerize lactic acid. A small amount of a chain-extending agent (e.g., a diisocyanate compound, an epoxy compound or an acid anhydride) may also be employed. The polylactic acid may be a homopolymer or a copolymer, such as one that contains monomer units derived from L-lactic acid and monomer units derived from D-lactic acid. Although not required, the rate of content of one of the monomer unit derived from L-lactic acid and the monomer unit derived from D-lactic acid is preferably about 85 mole % or more, in some embodiments about 90 mole % or more, and in some embodiments, about 95 mole % or more. Multiple polylactic acids, each having a different ratio between the monomer unit derived from L-lactic acid and the monomer unit derived from D-lactic acid, may be blended at an arbitrary percentage. Of course, polylactic acid may also be blended with other types of polymers (e.g., polyolefins, polyesters, etc.).

In one particular embodiment, the polylactic acid has the following general structure:

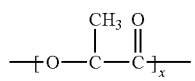

One specific example of a suitable polylactic acid polymer that may be used in the present invention is commercially available from Biomer, Inc. of Krailling, Germany) under the name BIOMER™ L9000. Other suitable polylactic acid polymers are commercially available from Natureworks LLC of Minnetonka, Minn. (NATUREWORKS®) or Mitsui Chemical (LACEAM). Still other suitable polylactic acids may be described in U.S. Pat. Nos. 4,797,468; 5,470,944; 5,770,682; 5,821,327; 5,880,254; and 6,326,458.

The polylactic acid typically has a number average molecular weight ("$M_n$") ranging from about 40,000 to about 180,000 grams per mole, in some embodiments from about 50,000 to about 160,000 grams per mole, and in some embodiments, from about 80,000 to about 120,000 grams per mole. Likewise, the polymer also typically has a weight average molecular weight ("$M_w$") ranging from about 80,000 to about 250,000 grams per mole, in some embodiments from about 100,000 to about 200,000 grams per mole, and in some embodiments, from about 110,000 to about 160,000 grams per mole. The ratio of the weight average molecular weight to the number average molecular weight ("$M_w/M_n$"), i.e., the "polydispersity index", is also relatively low. For example, the polydispersity index typically ranges from about 1.0 to about 3.0, in some embodiments from about 1.1 to about 2.0, and in some embodiments, from about 1.2 to about 1.8. The weight and number average molecular weights may be determined by methods known to those skilled in the art.

The polylactic acid may also have an apparent viscosity of from about 50 to about 600 Pascal seconds (Pa·s), in some embodiments from about 100 to about 500 Pa·s, and in some embodiments, from about 200 to about 400 Pa·s, as determined at a temperature of 190° C. and a shear rate of 1000 sec$^{-1}$. The melt flow rate of the polylactic acid (on a dry basis) may also range from about 0.1 to about 40 grams per 10 minutes, in some embodiments from about 0.5 to about 20 grams per 10 minutes, and in some embodiments, from about 5 to about 15 grams per 10 minutes, determined at a load of 2160 grams and at 190° C.

Some types of neat polyesters (e.g., polylactic acid) can absorb water from the ambient environment such that it has a moisture content of about 500 to 600 parts per million ("ppm"), or even greater, based on the dry weight of the starting polylactic acid. Moisture content may be determined in a variety of ways as is known in the art, such as in accordance with ASTM D 7191-05, such as described below. Because the presence of water during melt processing can hydrolytically degrade the polyester and reduce its molecular weight, it is sometimes desired to dry the polyester prior to blending. In most embodiments, for example, it is desired that the polyester have a moisture content of about 300 parts per million ("ppm") or less, in some embodiments about 200 ppm or less, in some embodiments from about 1 to about 100 ppm prior to blending with the microinclusion and nanoinclusion additives. Drying of the polyester may occur, for instance, at a temperature of from about 50° C. to about 100° C., and in some embodiments, from about 70° C. to about 80° C.

B. Microinclusion Additive

As used herein, the term "microinclusion additive" generally refers to any amorphous, crystalline, or semi-crystalline material that is capable of being dispersed within the polymer matrix in the form of discrete domains of a micro-scale size. For example, prior to drawing, the domains may have an average cross-sectional dimension of from about 0.05 μm to about 30 μm, in some embodiments from about 0.1 μm to about 25 μm, in some embodiments from about 0.5 μm to about 20 μm, and in some embodiments from about 1 μm to about 10 μm. The term "cross-sectional dimension" generally refers to a characteristic dimension (e.g., width or diameter) of a domain, which is substantially orthogonal to its major axis (e.g., length) and also typically substantially orthogonal to the direction of the stress applied during drawing. While typically formed from the microinclusion additive, it should be also understood that the micro-scale domains may also be formed from a combination of the microinclusion and nanoinclusion additives and/or other components of the composition.

The microinclusion additive is generally polymeric in nature and possesses a relatively high molecular weight to help improve the melt strength and stability of the thermoplastic composition. Typically, the microinclusion polymer may be generally immiscible with the matrix polymer. In this manner, the additive can better become dispersed as discrete phase domains within a continuous phase of the matrix polymer. The discrete domains are capable of absorbing energy that arises from an external force, which increases the overall toughness and strength of the resulting material. The domains may have a variety of different shapes, such as elliptical, spherical, cylindrical, plate-like, tubular, etc. In one embodiment, for example, the domains have a substantially elliptical shape. The physical dimension of an individual domain is typically small enough to minimize the propagation of cracks through the polymeric material upon the application of an external stress, but large enough to initiate microscopic plastic deformation and allow for shear and/or stress intensity zones at and around particle inclusions.

While the polymers may be immiscible, the microinclusion additive may nevertheless be selected to have a solubility parameter that is relatively similar to that of the matrix polymer. This can improve the interfacial compatibility and physical interaction of the boundaries of the discrete and continuous phases, and thus reduces the likelihood that the composition will fracture. In this regard, the ratio of the solubility parameter for the matrix polymer to that of the additive is typically from about 0.5 to about 1.5, and in some embodiments, from about 0.8 to about 1.2. For example, the microinclusion additive may have a solubility parameter of from about 15 to about 30 MJoules$^{1/2}$/m$^{3/2}$, and in some embodiments, from about 18 to about 22 MJoules$^{1/2}$/m$^{3/2}$, while polylactic acid may have a solubility parameter of about 20.5 MJoules$^{1/2}$/m$^{3/2}$. The term "solubility parameter" as used herein refers to the "Hildebrand Solubility Parameter", which is the square root of the cohesive energy density and calculated according to the following equation:

$$\delta = \sqrt{((\Delta H_v - RT)/V_m)}$$

where:
$\Delta Hv$=heat of vaporization
R=Ideal Gas constant
T=Temperature
Vm=Molecular Volume The Hildebrand solubility parameters for many polymers are also available from the Solubility Handbook of Plastics, by Wyeych (2004), which is incorporated herein by reference.

The microinclusion additive may also have a certain melt flow rate (or viscosity) to ensure that the discrete domains and resulting pores can be adequately maintained. For example, if the melt flow rate of the additive is too high, it tends to flow and disperse uncontrollably through the continuous phase. This results in lamellar, plate-like domains or co-continuous phase structures that are difficult to maintain and also likely to prematurely fracture. Conversely, if the melt flow rate of the additive is too low, it tends to clump together and form very large elliptical domains, which are difficult to disperse during blending. This may cause uneven distribution of the additive through the entirety of the continuous phase. In this regard, the present inventors have discovered that the ratio of the melt flow rate of the microinclusion additive to the melt flow rate of the matrix polymer is typically from about 0.2 to about 8, in some embodiments from about 0.5 to about 6, and in some embodiments, from about 1 to about 5. The microinclusion additive may, for example, have a melt flow rate of from about 0.1 to about 250 grams per 10 minutes, in some embodiments from about 0.5 to about 200 grams per 10 minutes, and in some embodiments, from about 5 to about 150 grams per 10 minutes, determined at a load of 2160 grams and at 190° C.

In addition to the properties noted above, the mechanical characteristics of the microinclusion additive may also be selected to achieve the desired porous network. For example, when a blend of the matrix polymer and microinclusion additive is applied with an external force, stress concentrations (e.g., including normal or shear stresses) and shear and/or plastic yielding zones may be initiated at and around the discrete phase domains as a result of stress concentrations that arise from a difference in the elastic modulus of the additive and matrix polymer. Larger stress concentrations promote more intensive localized plastic flow at the domains, which allows them to become significantly elongated when stresses are imparted. These elongated domains can allow the composition to exhibit a more pliable and softer behavior than the matrix polymer, such as when it is a rigid polyester resin. To enhance the stress concentrations, the microinclusion additive may be selected to have a relatively low Young's modulus of elasticity in comparison to the matrix polymer. For example, the ratio of the modulus of elasticity of the matrix polymer to that of the additive is typically from about 1 to about 250, in some embodiments from about 2 to about 100, and in some embodiments, from about 2 to about 50. The modulus of elasticity of the microinclusion additive may, for instance, range from about 2 to about 1000 Megapascals (MPa), in some embodiments from about 5 to about 500 MPa, and in some embodiments, from about 10 to about 200 MPa. To the contrary, the modulus of elasticity of polylactic acid, for example, is typically from about 800 MPa to about 3000 MPa.

While a wide variety of microinclusion additives may be employed that have the properties identified above, particularly suitable examples of such additives may include synthetic polymers, such as polyolefins (e.g., polyethylene, polypropylene, polybutylene, etc.); styrenic copolymers (e.g., styrene-butadiene-styrene, styrene-isoprene-styrene, styrene-ethylene-propylene-styrene, styrene-ethylene-butadiene-styrene, etc.); polytetrafluoroethylenes; polyesters (e.g., recycled polyester, polyethylene terephthalate, etc.); polyvinyl acetates (e.g., poly(ethylene vinyl acetate), polyvinyl chloride acetate, etc.); polyvinyl alcohols (e.g., polyvinyl alcohol, poly(ethylene vinyl alcohol), etc.); polyvinyl butyrals; acrylic resins (e.g., polyacrylate, polymethylacrylate, polymethylmethacrylate, etc.); polyamides (e.g., nylon); polyvinyl chlorides; polyvinylidene chlorides; polystyrenes; polyurethanes; etc. Suitable polyolefins may, for instance, include ethylene polymers (e.g., low density polyethylene ("LDPE"), high density polyethylene ("HDPE"), linear low density polyethylene ("LLDPE"), etc.), propylene homopolymers (e.g., syndiotactic, atactic, isotactic, etc.), propylene copolymers, and so forth.

In one particular embodiment, the polymer is a propylene polymer, such as homopolypropylene or a copolymer of propylene. The propylene polymer may, for instance, be formed from a substantially isotactic polypropylene homopolymer or a copolymer containing equal to or less than about 10 wt. % of other monomer, i.e., at least about 90% by weight propylene. Such homopolymers may have a melting point of from about 160° C. to about 170° C.

In still another embodiment, the polyolefin may be a copolymer of ethylene or propylene with another α-olefin, such as a $C_3$-$C_{20}$ α-olefin or $C_3$-$C_{12}$ α-olefin. Specific examples of suitable α-olefins include 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired α-olefin comonomers are 1-butene, 1-hexene and 1-octene. The ethylene or propylene content of such copolymers may be from about 60 mole % to about 99 mole %, in some embodiments from about 80 mole % to about 98.5 mole %, and in some embodiments, from about 87 mole % to about 97.5 mole %. The α-olefin content may likewise range from about 1 mole % to about 40 mole %, in some embodiments from about 1.5 mole % to about 15 mole %, and in some embodiments, from about 2.5 mole % to about 13 mole %.

Exemplary olefin copolymers for use in the present invention include ethylene-based copolymers available under the designation EXACT™ from ExxonMobil Chemical Company of Houston, Tex. Other suitable ethylene copolymers are available under the designation ENGAGE™, AFFINITY™, DOWLEX™ (LLDPE) and ATTANE™ (ULDPE) from Dow Chemical Company of Midland, Mich. Other suitable ethylene polymers are described in U.S. Pat. No. 4,937,299 to Ewen et al.; U.S. Pat. No. 5,218,071 to Tsutsui et al.; U.S. Pat. No. 5,272,236 to Lai, et al.; and U.S. Pat. No. 5,278,272 to Lai, et al. Suitable propylene copolymers are also commercially available under the designations VISTAMAXX™ from ExxonMobil Chemical Co. of Houston, Tex.; FINA™ (e.g., 8573) from Atofina Chemicals of Feluy, Belgium; TAFMER™ available from Mitsui Petrochemical Industries; and VERSIFY™ available from Dow Chemical Co. of Midland, Mich. Suitable polypropylene homopolymers may likewise include Exxon Mobil 3155 polypropylene, Exxon Mobil Achieve™ resins, and Total M3661 PP resin. Other examples of suitable propylene polymers are described in U.S. Pat. No. 6,500,563 to Datta, et al.; U.S. Pat. No. 5,539,056 to Yang, et al.; and U.S. Pat. No. 5,596,052 to Resconi, et al.

Any of a variety of known techniques may generally be employed to form the olefin copolymers. For instance, olefin polymers may be formed using a free radical or a coordination catalyst (e.g., Ziegler-Natta). Preferably, the olefin polymer is formed from a single-site coordination catalyst, such as a metallocene catalyst. Such a catalyst system produces ethylene copolymers in which the comonomer is randomly distributed within a molecular chain and uniformly distributed across the different molecular weight fractions. Metallocene-catalyzed polyolefins are described, for instance, in U.S. Pat. No. 5,571,619 to McAlpin et al.; U.S. Pat. No. 5,322,728 to Davis et al.; U.S. Pat. No. 5,472,775 to Obijeski et al.; U.S. Pat. No. 5,272,236 to Lai et al.; and U.S. Pat. No. 6,090,325 to Wheat, et al. Examples of metallocene catalysts include bis(n-butylcyclopentadienyl)titanium dichloride, bis(n-butylcyclopentadienyl)zirconium dichloride, bis(cyclopentadienyl)scandium chloride, bis(indenyl)zirconium dichloride, bis(methylcyclopentadienyl)titanium dichloride, bis(methylcyclopentadienyl)zirconium dichloride, cobaltocene, cyclopentadienyltitanium trichloride, ferrocene, hafnocene dichloride, isopropyl(cyclopentadienyl,-1-flourenyl)zirconium dichloride, molybdocene dichloride, nickelocene, niobocene dichloride, ruthenocene, titanocene dichloride, zirconocene chloride hydride, zirconocene dichloride, and so forth. Polymers made using metallocene catalysts typically have a narrow molecular weight range. For instance, metallocene-catalyzed polymers may have polydispersity numbers ($M_w/M_n$) of below 4, controlled short chain branching distribution, and controlled isotacticity.

Regardless of the materials employed, the relative percentage of the microinclusion additive in the thermoplastic composition is selected to achieve the desired properties without significantly impacting the base properties of the composition. For example, the microinclusion additive is typically employed in an amount of from about 1 wt. % to about 30 wt. %, in some embodiments from about 2 wt. % to about 25 wt. %, and in some embodiments, from about 5 wt. % to about 20 wt. % of the thermoplastic composition, based on the weight of the continuous phase (matrix polymer(s)). The concentration of the microinclusion additive in the entire thermoplastic composition may likewise constitute from about 0.1 wt. % to about 30 wt. %, in some embodiments from about 0.5 wt. % to about 25 wt. %, and in some embodiments, from about 1 wt. % to about 20 wt. %.

C. Nanoinclusion Additive

As used herein, the term "nanoinclusion additive" generally refers to any amorphous, crystalline, or semi-crystalline material that is capable of being dispersed within the polymer matrix in the form of discrete domains of a nano-scale size. For example, prior to drawing, the domains may have an average cross-sectional dimension of from about 1 to about 1000 nanometers, in some embodiments from about 5 to about 800 nanometers, in some embodiments from about 10 to about 500 nanometers, and in some embodiments from about 20 to about 200 nanometers. It should be also understood that the nano-scale domains may also be formed from a combination of the microinclusion and nanoinclusion additives and/or other components of the composition. The nanoinclusion additive is typically employed in an amount of from about 0.05 wt. % to about 20 wt. %, in some embodiments from about 0.1 wt. % to about 10 wt. %, and in some embodiments, from about 0.5 wt. % to about 5 wt. % of the thermoplastic composition, based on the weight of the continuous phase (matrix polymer(s)). The concentration of the nanoinclusion additive in the entire thermoplastic composition may likewise be from about 0.01 wt. % to about 15 wt. %, in some embodiments from about 0.05 wt. % to about 10 wt. %, and in some embodiments, from about 0.3 wt. % to about 6 wt. % of the thermoplastic composition.

The nanoinclusion additive may be polymeric in nature and possess a relatively high molecular weight to help improve the melt strength and stability of the thermoplastic composition. To enhance its ability to become dispersed into nano-scale domains, the nanoinclusion additive may also be selected from materials that are generally compatible with the matrix polymer and the microinclusion additive. This may be particularly useful when the matrix polymer or the microinclusion additive possesses a polar moiety, such as a polyester. One example such a nanoinclusion additive is a functionalized polyolefin. The polar component may, for example, be provided by one or more functional groups and the non-polar component may be provided by an olefin. The olefin component of the nanoinclusion additive may generally be formed from any linear or branched α-olefin monomer, oligomer, or polymer (including copolymers) derived from an olefin monomer, such as described above.

The functional group of the nanoinclusion additive may be any group, molecular segment and/or block that provides a polar component to the molecule and is not compatible with the matrix polymer. Examples of molecular segment and/or blocks not compatible with polyolefin may include acrylates, styrenics, polyesters, polyamides, etc. The functional group can have an ionic nature and comprise charged metal ions. Particularly suitable functional groups are maleic anhydride, maleic acid, fumaric acid, maleimide, maleic acid hydrazide, a reaction product of maleic anhydride and diamine, methylnadic anhydride, dichloromaleic anhydride, maleic acid amide, etc. Maleic anhydride modified polyolefins are particularly suitable for use in the present invention. Such modified polyolefins are typically formed by grafting maleic anhydride onto a polymeric backbone material. Such maleated polyolefins are available from E. I. du Pont de Nemours and Company under the designation Fusabond®, such as the P Series (chemically modified polypropylene), E Series (chemically modified polyethylene), C Series (chemically modified ethylene vinyl acetate), A Series (chemically modified ethylene acrylate copolymers or terpolymers), or N Series (chemically modified ethylene-propylene, ethylene-propylene diene monomer ("EPDM") or ethylene-octene). Alternatively, maleated polyolefins are also available from Chemtura Corp. under the designation Polybond® and Eastman Chemical Company under the designation Eastman G series.

In certain embodiments, the nanoinclusion additive may also be reactive. One example of such a reactive nanoinclusion additive is a polyepoxide that contains, on average, at least two oxirane rings per molecule. Without intending to be limited by theory, it is believed that such polyepoxide molecules can induce reaction of the matrix polymer (e.g., polyester) under certain conditions, thereby improving its melt strength without significantly reducing glass transition temperature. The reaction may involve chain extension, side chain branching, grafting, copolymer formation, etc. Chain extension, for instance, may occur through a variety of different reaction pathways. For instance, the modifier may enable a nucleophilic ring-opening reaction via a carboxyl terminal group of a polyester (esterification) or via a hydroxyl group (etherification). Oxazoline side reactions may likewise occur to form esteramide moieties. Through such reactions, the molecular weight of the matrix polymer may be increased to counteract the degradation often observed during melt processing. While it may be desirable to induce a reaction with the matrix polymer as described above, the present inventors have discovered that too much of a reaction can lead to crosslinking between polymer backbones. If such crosslinking is allowed to proceed to a significant extent, the resulting polymer blend can become brittle and difficult to process into a material with the desired strength and elongation properties.

In this regard, the present inventors have discovered that polyepoxides having a relatively low epoxy functionality are particularly effective, which may be quantified by its "epoxy equivalent weight." The epoxy equivalent weight reflects the amount of resin that contains one molecule of an epoxy group, and it may be calculated by dividing the number average molecular weight of the modifier by the number of epoxy groups in the molecule. The polyepoxide of the present invention typically has a number average molecular weight from about 7,500 to about 250,000 grams per mole, in some embodiments from about 15,000 to about 150,000 grams per mole, and in some embodiments, from about 20,000 to 100,000 grams per mole, with a polydispersity index typically ranging from 2.5 to 7. The polyepoxide may contain less than 50, in some embodiments from 5 to 45, and in some embodiments, from 15 to 40 epoxy groups. In turn, the epoxy equivalent weight may be less than about 15,000 grams per mole, in some embodiments from about 200 to about 10,000 grams per mole, and in some embodiments, from about 500 to about 7,000 grams per mole.

The polyepoxide may be a linear or branched, homopolymer or copolymer (e.g., random, graft, block, etc.) containing terminal epoxy groups, skeletal oxirane units, and/or pendent epoxy groups. The monomers employed to form such polyepoxides may vary. In one particular embodiment, for example, the polyepoxide contains at least one epoxy-functional (meth)acrylic monomeric component. As used herein, the term "(meth)acrylic" includes acrylic and methacrylic monomers, as well as salts or esters thereof, such as acrylate and methacrylate monomers. For example, suitable epoxy-functional (meth)acrylic monomers may include, but are not limited to, those containing 1,2-epoxy groups, such as glycidyl acrylate and glycidyl methacrylate. Other suitable epoxy-functional monomers include allyl glycidyl ether, glycidyl ethacrylate, and glycidyl itoconate.

The polyepoxide typically has a relatively high molecular weight, as indicated above, so that it may not only result in chain extension, but also help to achieve the desired blend morphology. The resulting melt flow rate of the polymer is thus typically within a range of from about 10 to about 200 grams per 10 minutes, in some embodiments from about 40 to about 150 grams per 10 minutes, and in some embodiments, from about 60 to about 120 grams per 10 minutes, determined at a load of 2160 grams and at a temperature of 190° C.

If desired, additional monomers may also be employed in the polyepoxide to help achieve the desired molecular weight. Such monomers may vary and include, for example, ester monomers, (meth)acrylic monomers, olefin monomers, amide monomers, etc. In one particular embodiment, for example, the polyepoxide includes at least one linear or branched α-olefin monomer, such as those having from 2 to 20 carbon atoms and preferably from 2 to 8 carbon atoms. Specific examples include ethylene, propylene, 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired α-olefin comonomers are ethylene and propylene.

Another suitable monomer may include a (meth)acrylic monomer that is not epoxy-functional. Examples of such (meth)acrylic monomers may include methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, 2-hydroxyethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, etc., as well as combinations thereof.

In one particularly desirable embodiment of the present invention, the polyepoxide is a terpolymer formed from an epoxy-functional (meth)acrylic monomeric component, α-olefin monomeric component, and non-epoxy functional (meth)acrylic monomeric component. For example, the polyepoxide may be poly(ethylene-co-methylacrylate-co-glycidyl methacrylate), which has the following structure:

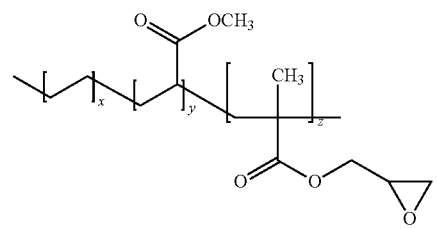

wherein, x, y, and z are 1 or greater.

The epoxy functional monomer may be formed into a polymer using a variety of known techniques. For example, a monomer containing polar functional groups may be grafted onto a polymer backbone to form a graft copolymer. Such grafting techniques are well known in the art and described, for instance, in U.S. Pat. No. 5,179,164. In other embodiments, a monomer containing epoxy functional groups may be copolymerized with a monomer to form a block or random copolymer using known free radical polymerization techniques, such as high pressure reactions, Ziegler-Natta catalyst reaction systems, single site catalyst (e.g., metallocene) reaction systems, etc.

The relative portion of the monomeric component(s) may be selected to achieve a balance between epoxy-reactivity and melt flow rate. More particularly, high epoxy monomer contents can result in good reactivity with the matrix polymer, but too high of a content may reduce the melt flow rate to such an extent that the polyepoxide adversely impacts the melt strength of the polymer blend. Thus, in most embodiments, the epoxy-functional (meth)acrylic monomer(s) constitute from about 1 wt. % to about 25 wt. %, in some embodiments from about 2 wt. % to about 20 wt. %, and in some embodiments, from about 4 wt. % to about 15 wt. % of the copolymer. The α-olefin monomer(s) may likewise constitute from about 55 wt. % to about 95 wt. %, in some embodiments from about 60 wt. % to about 90 wt. %, and in some embodiments, from about 65 wt. % to about 85 wt. % of the copolymer. When employed, other monomeric components (e.g., non-epoxy functional (meth)acrylic monomers) may constitute from about 5 wt. % to about 35 wt. %, in some embodiments from about 8 wt. % to about 30 wt. %, and in some embodiments, from about 10 wt. % to about 25 wt. % of the copolymer. One specific example of a suitable polyepoxide that may be used in the present invention is commercially available from Arkema under the name LOTADER® AX8950 or AX8900. LOTADER® AX8950, for instance, has a melt flow rate of 70 to 100 g/10 min and has a glycidyl methacrylate monomer content of 7 wt. % to 11 wt. %, a methyl acrylate monomer content of 13 wt. % to 17 wt. %, and an ethylene monomer content of 72 wt. % to 80 wt. %. Another suitable polyepoxide is commercially available from DuPont under the name ELVALOY® PTW, which is a terpolymer of ethylene, butyl acrylate, and glycidyl methacrylate and has a melt flow rate of 12 g/10 min.

In addition to controlling the type and relative content of the monomers used to form the polyepoxide, the overall weight percentage may also be controlled to achieve the desired benefits. For example, if the modification level is too low, the desired increase in melt strength and mechanical properties may not be achieved. The present inventors have also discovered, however, that if the modification level is too high, processing may be restricted due to strong molecular interactions (e.g., crosslinking) and physical network formation by the epoxy functional groups. Thus, the polyepoxide is typically employed in an amount of from about 0.05 wt. % to about 10 wt. %, in some embodiments from about 0.1 wt. % to about 8 wt. %, in some embodiments from about 0.5 wt. % to about 5 wt. %, and in some embodiments, from about 1 wt. % to about 3 wt. %, based on the weight of the matrix polymer employed in the composition. The polyepoxide may also constitute from about 0.05 wt. % to about 10 wt. %, in some embodiments from about 0.05 wt. % to about 8 wt. %, in some embodiments from about 0.1 wt. % to about 5 wt. %, and in some embodiments, from about 0.5 wt. % to about 3 wt. %, based on the total weight of the composition.

Other reactive nanoinclusion additives may also be employed in the present invention, such as oxazoline-functionalized polymers, cyanide-functionalized polymers, etc. When employed, such reactive nanoinclusion additives may be employed within the concentrations noted above for the polyepoxide. In one particular embodiment, an oxazoline-grafted polyolefin may be employed that is a polyolefin grafted with an oxazoline ring-containing monomer. The oxazoline may include a 2-oxazoline, such as 2-vinyl-2-oxazoline (e.g., 2-isopropenyl-2-oxazoline), 2-fatty-alkyl-2-oxazoline (e.g., obtainable from the ethanolamide of oleic acid, linoleic acid, palmitoleic acid, gadoleic acid, erucic acid and/or arachidonic acid) and combinations thereof. In another embodiment, the oxazoline may be selected from ricinoloxazoline maleinate, undecyl-2-oxazoline, soya-2-oxazoline, ricinus-2-oxazoline and combinations thereof, for example. In yet another embodiment, the oxazoline is selected from 2-isopropenyl-2-oxazoline, 2-isopropenyl-4,4-dimethyl-2-oxazoline and combinations thereof.

Nanofillers may also be employed, such as carbon black, carbon nanotubes, carbon nanofibers, nanoclays, metal nanoparticles, nanosilica, nanoalumina, etc. Nanoclays are particularly suitable. The term "nanoclay" generally refers to nanoparticles of a clay material (a naturally occurring mineral, an organically modified mineral, or a synthetic nanomaterial), which typically have a platelet structure. Examples of nanoclays include, for instance, montmorillonite (2:1 layered smectite clay structure), bentonite (aluminium phyllosilicate formed primarily of montmorillonite), kaolinite (1:1 aluminosilicate having a platy structure and empirical formula of $Al_2Si_2O_5(OH)_4$), halloysite (1:1 aluminosilicate having a tubular structure and empirical formula of $Al_2Si_2O_5(OH)_4$), etc. An example of a suitable nanoclay is Cloisite®, which is a montmorillonite nanoclay and commercially available from Southern Clay Products, Inc. Other examples of synthetic nanoclays include but are not limited to a mixed-metal hydroxide nanoclay, layered double hydroxide nanoclay (e.g., sepiocite), laponite, hectorite, saponite, indonite, etc.

If desired, the nanoclay may contain a surface treatment to help improve compatibility with the matrix polymer (e.g., polyester). The surface treatment may be organic or inorganic. In one embodiment, an organic surface treatment is employed that is obtained by reacting an organic cation with the clay. Suitable organic cations may include, for instance, organoquaternary ammonium compounds that are capable of exchanging cations with the clay, such as dimethyl bis[hydrogenated tallow]ammonium chloride (2M2HT), methyl benzyl bis[hydrogenated tallow]ammonium chloride (MB2HT), methyl tris[hydrogenated tallow alkyl] chloride (M3HT), etc. Examples of commercially available organic nanoclays may include, for instance, Dellite® 43B (Laviosa Chimica of Livorno, Italy), which is a montmorillonite clay modified with dimethyl benzylhydrogenated tallow ammonium salt. Other examples include Cloisite® 25A and Cloisite® 30B (Southern Clay Products) and Nanofil 919 (Süd Chemie). If desired, the nanofiller can be blended with a carrier resin to form a masterbatch that enhances the compatibility of the additive with the other polymers in the composition. Particularly suitable carrier resins include, for instance, polyesters (e.g., polylactic acid, polyethylene terephthalate, etc.); polyolefins (e.g., ethylene polymers, propylene polymers, etc.); and so forth, as described in more detail above.

In certain embodiments of the present invention, multiple nanoinclusion additives may be employed in combination. For instance, a first nanoinclusion additive (e.g., polyepoxide) may be dispersed in the form of domains having an average cross-sectional dimension of from about 50 to about 500 nanometers, in some embodiments from about 60 to about 400 nanometers, and in some embodiments from about 80 to about 300 nanometers. A second nanoinclusion additive (e.g., nanofiller) may also be dispersed in the form of domains that are smaller than the first nanoinclusive additive, such as those having an average cross-sectional dimension of from about 1 to about 50 nanometers, in some embodiments from about 2 to about 45 nanometers, and in some embodiments from about 5 to about 40 nanometers. When employed, the first and/or second nanoinclusion additives typically constitute from about 0.05 wt. % to about 20 wt. %, in some embodiments from about 0.1 wt. % to about 10 wt. %, and in some embodiments, from about 0.5 wt. % to about 5 wt. % of the thermoplastic composition, based on the weight of the continuous phase (matrix polymer(s)). The concentration of the first and/or second nanoinclusion additives in the entire thermoplastic composition may likewise be from about 0.01 wt. % to about 15 wt. %, in some embodiments from about 0.05 wt. % to about 10 wt. %, and in some embodiments, from about 0.1 wt. % to about 8 wt. % of the thermoplastic composition.

D. Other Components

A wide variety of ingredients may be employed in the composition for a variety of different reasons. For instance, in one particular embodiment, an interphase modifier may be employed in the thermoplastic composition to help reduce the degree of friction and connectivity between the microinclusion additive and matrix polymer, and thus enhance the degree and uniformity of debonding. In this manner, the pores can become distributed in a more homogeneous fashion throughout the composition. The modifier may be in a liquid or semi-solid form at room temperature (e.g., 25° C.) so that it possesses a relatively low viscosity, allowing it to be more readily incorporated into the thermoplastic composition and to easily migrate to the polymer surfaces. In this regard, the kinematic viscosity of the interphase modifier is typically from about 0.7 to about 200 centistokes ("cs"), in some embodiments from about 1 to about 100 cs, and in some embodiments, from about 1.5 to about 80 cs, determined at 40° C. In addition, the interphase modifier is also typically hydrophobic so that it has an affinity for the microinclusion additive, for example, resulting in a change in the interfacial tension between the matrix polymer and the additive. By reducing physical forces at the interfaces between the matrix polymer and the microinclusion additive, it is believed that the low viscosity, hydrophobic nature of the modifier can help facilitate debonding. As used herein, the term "hydrophobic" typically refers to a material having a contact angle of water in air of about 40° or more, and in some cases, about 60° or more. In contrast, the term "hydrophilic" typically refers to a material having a contact angle of water in air of less than about 40°. One suitable test for measuring the contact angle is ASTM D5725-99 (2008).

Suitable hydrophobic, low viscosity interphase modifiers may include, for instance, silicones, silicone-polyether copolymers, aliphatic polyesters, aromatic polyesters, alkylene glycols (e.g., ethylene glycol, diethylene glycol, triethylene glycol, tetraethylene glycol, propylene glycol, polyethylene glycol, polypropylene glycol, polybutylene glycol, etc.), alkane diols (e.g., 1,3-propanediol, 2,2-dimethyl-1,3-propanediol, 1,3-butanediol, 1,4-butanediol, 1,5-pentanediol, 1,6-hexanediol, 2,2,4-trimethyl-1,6 hexanediol, 1,3-cyclohexanedimethanol, 1,4-cyclohexanedimethanol, 2,2,4,4-tetramethyl-1,3-cyclobutanediol, etc.), amine oxides (e.g., octyldimethylamine oxide), fatty acid esters, fatty acid amides (e.g., oleamide, erucamide, stearamide, ethylene bis(stearamide), etc.), mineral, and vegetable oils, and so forth. One particularly suitable liquid or semi-solid is polyether polyol, such as commercially available under the trade name Pluriol® WI from BASF Corp. Another suitable modifier is a partially renewable ester, such as commercially available under the trade name HALLGREEN® IM from Hallstar.

When employed, the interphase modifier may constitute from about 0.1 wt. % to about 20 wt. %, in some embodiments from about 0.5 wt. % to about 15 wt. %, and in some embodiments, from about 1 wt. % to about 10 wt. % of the thermoplastic composition, based on the weight of the continuous phase (matrix polymer(s)). The concentration of the interphase modifier in the entire thermoplastic composition may likewise constitute from about 0.05 wt. % to about 20 wt. %, in some embodiments from about 0.1 wt. % to about 15 wt. %, and in some embodiments, from about 0.5 wt. % to about 10 wt. %.

When employed in the amounts noted above, the interphase modifier has a character that enables it to readily migrate to the interfacial surface of the polymers and facilitate debonding without disrupting the overall melt properties of the thermoplastic composition. For example, the interphase modifier does not typically have a plasticizing effect on the polymer by reducing its glass transition temperature. Quite to the contrary, the present inventors have discovered that the glass transition temperature of the thermoplastic composition may be substantially the same as the initial matrix polymer. In this regard, the ratio of the glass temperature of the composition to that of the matrix polymer is typically from about 0.7 to about 1.3, in some embodiments from about 0.8 to about 1.2, and in some embodiments, from about 0.9 to about 1.1. The thermoplastic composition may, for example, have a glass transition temperature of from about 35° C. to about 80° C., in some embodiments from about 40° C. to about 80° C., and in some embodiments, from about 50° C. to about 65° C. The melt flow rate of the thermoplastic composition may also be similar to that of the matrix polymer. For example, the melt flow rate of the composition (on a dry basis) may be from about 0.1 to about 70 grams per 10 minutes, in some embodiments from about 0.5 to about 50 grams per 10 minutes, and in some embodiments, from about 5 to about 25 grams per 10 minutes, determined at a load of 2160 grams and at a temperature of 190° C.

Compatibilizers may also be employed that improve interfacial adhesion and reduce the interfacial tension between the domain and the matrix, thus allowing the formation of smaller domains during mixing. Examples of suitable compatibilizers may include, for instance, copolymers functionalized with epoxy or maleic anhydride chemical moieties. An example of a maleic anhydride compatibilizer is polypropylene-grafted-maleic anhydride, which is commercially available from Arkema under the trade names Orevac™ 18750 and Orevac™ CA 100. When employed, compatibilizers may constitute from about 0.05 wt. % to about 10 wt. %, in some embodiments from about 0.1 wt. % to about 8 wt. %, and in some embodiments, from about 0.5 wt. % to about 5 wt. % of the thermoplastic composition, based on the weight of the continuous phase matrix.

Other suitable materials that may also be used in the thermoplastic composition, such as catalysts, antioxidants, stabilizers, surfactants, waxes, solid solvents, fillers, nucleating agents (e.g., calcium carbonate, etc.), particulates, and other materials added to enhance the processability and mechanical properties of the thermoplastic composition. Nevertheless, one beneficial aspect of the present invention is that good properties may be provided without the need for various conventional additives, such as blowing agents (e.g., chlorofluorocarbons, hydrochlorofluorocarbons, hydrocarbons, carbon dioxide, supercritical carbon dioxide, nitrogen, etc.) and plasticizers (e.g., solid or semi-solid polyethylene glycol). In fact, the thermoplastic composition may be generally free of blowing agents and/or plasticizers. For example, blowing agents and/or plasticizers may be present in an amount of no more than about 1 wt. %, in some embodiments no more than about 0.5 wt. %, and in some embodiments, from about 0.001 wt. % to about 0.2 wt. % of the thermoplastic composition. Further, due to its stress whitening properties, as described in more detail below, the resulting composition may achieve an opaque color (e.g., white) without the need for conventional pigments, such as titanium dioxide. In certain embodiments, for example, pigments may be present in an amount of no more than about 1 wt. %, in some embodiments no more than about 0.5 wt. %, and in some embodiments, from about 0.001 wt. % to about 0.2 wt. % of the thermoplastic composition.

II. Polymeric Material

Despite the fact that it has anisotropic properties, the polymeric material is generally considered monolithic to the extent that it is formed from the thermoplastic composition described above. To form the thermoplastic composition, the components are typically blended together using any of a variety of known techniques. In one embodiment, for example, the components may be supplied separately or in combination. For instance, the components may first be dry mixed together to form an essentially homogeneous dry mixture, and they may likewise be supplied either simultaneously or in sequence to a melt processing device that dispersively blends the materials. Batch and/or continuous melt processing techniques may be employed. For example, a mixer/kneader, Banbury mixer, Farrel continuous mixer, single-screw extruder, twin-screw extruder, roll mill, etc., may be utilized to blend and melt process the materials. Particularly suitable melt processing devices may be a co-rotating, twin-screw extruder (e.g., ZSK-30 extruder available from Werner & Pfleiderer Corporation of Ramsey, N.J. or a Thermo Prism™ USALAB 16 extruder available from Thermo Electron Corp., Stone, England). Such extruders may include feeding and venting ports and provide high intensity distributive and dispersive mixing. For example, the components may be fed to the same or different feeding ports of the twin-screw extruder and melt blended to form a substantially homogeneous melted mixture. If desired, other additives may also be injected into the polymer melt and/or separately fed into the extruder at a different point along its length.

Regardless of the particular processing technique chosen, the resulting melt blended composition typically contains micro-scale domains of the microinclusion additive and nano-scale domains of the nanoinclusion additive as described above. The degree of shear/pressure and heat may be controlled to ensure sufficient dispersion, but not so high as to adversely reduce the size of the domains so that they are incapable of achieving the desired properties. For example, blending typically occurs at a temperature of from about 180° C. to about 300° C., in some embodiments from about 185° C. to about 250° C., and in some embodiments, from about 190° C. to about 240° C. Likewise, the apparent shear rate during melt processing may range from about 10 seconds$^{-1}$ to about 3000 seconds$^{-1}$, in some embodiments from about 50 seconds$^{-1}$ to about 2000 seconds$^{-1}$, and in some embodiments, from about 100 seconds$^{-1}$ to about 1200 seconds$^{-1}$. The apparent shear rate may be equal to $4Q/\pi R^3$, where Q is the volumetric flow rate ("m$^3$/s") of the polymer melt and R is the radius ("m") of the capillary (e.g., extruder die) through which the melted polymer flows. Of course, other variables, such as the residence time during melt processing, which is inversely proportional to throughput rate, may also be controlled to achieve the desired degree of homogeneity.

To achieve the desired shear conditions (e.g., rate, residence time, shear rate, melt processing temperature, etc.), the speed of the extruder screw(s) may be selected with a certain range. Generally, an increase in product temperature is observed with increasing screw speed due to the additional mechanical energy input into the system. For example, the screw speed may range from about 50 to about 600 revolutions per minute ("rpm"), in some embodiments from about 70 to about 500 rpm, and in some embodiments, from about 100 to about 300 rpm. This may result in a temperature that is sufficient high to disperse the microinclusion additive without adversely impacting the size of the resulting domains. The melt shear rate, and in turn the degree to which the additives are dispersed, may also be increased through the use of one or more distributive and/or dispersive mixing elements within the mixing section of the extruder. Suitable distributive mixers for single screw extruders may include, for instance, Saxon, Dulmage, Cavity Transfer mixers, etc. Likewise, suitable dispersive mixers may include Blister ring, Leroy/Maddock, CRD mixers, etc. As is well known in the art, the mixing may be further improved by using pins in the barrel that create a folding and reorientation of the polymer melt, such as those used in Buss Kneader extruders, Cavity Transfer mixers, and Vortex Intermeshing Pin (VIP) mixers.

Once formed, one or more zones ("first zones") of the material are then subjected to a deformational strain as described above to selectively impart the desired anisotropic properties to the material. This may be accomplished by straining selective portions of the material in the longitudinal direction (e.g., machine direction), transverse direction (e.g., cross-machine direction), etc., as well as combinations thereof. Various techniques may be employed to selectively strain one portion of the material to a certain degree, while drawing other portions of the material to a lesser degree, or even not at all. In one embodiment, for instance, one portion of the material may simply be bent alone one or multiple fold lines. In this manner, a porous network is typically created within the area of the fold, while the remaining unbent areas remain substantially unchanged.

Apart from simply being bent or folded, other techniques may also be employed, such as stamping, blanking, embossing, flanging, coining, etc. Referring to FIG. 3, one example of a stamping device 200 is shown that may be employed in the present invention. In this particular embodiment, the device 200 contains a hollow die 201 and a stamp 202. A polymeric material 203 may be placed in the device 200 so that it faces the edge of the die 201. The device 200 also has a clamping mechanism defined by jaws 204 and 205 to hold the polymeric material 203 in place during the stamping operation. The first jaw 204 surrounds the die 201 and may be fixed, while the other jaw 205 may be movable. To deform the polymeric material 203, the stamp 202 is pressed against the material as shown in FIG. 4. In this particular embodiment, the stamp 202 causes the central portion of the material to deform under strain such that the resulting material has a zoned configuration similar to shown in FIG.

1. Of course, this configuration is by no means required and other zoned configurations may also be formed by stamping.

Figure 5:
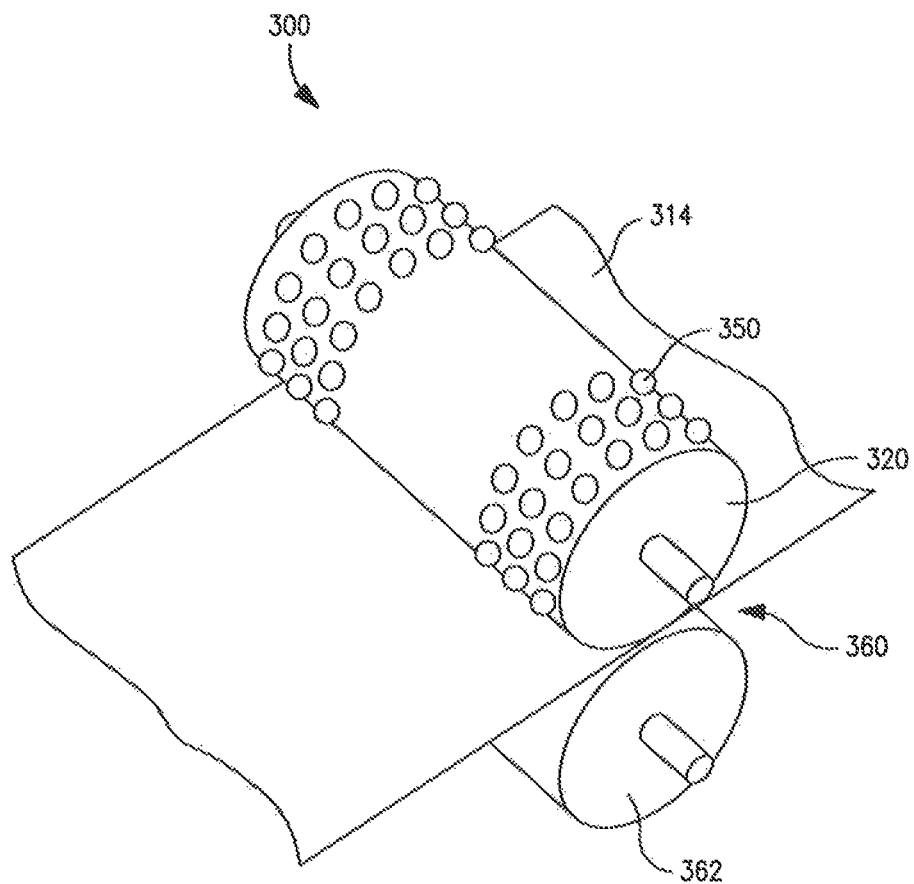
FIG. 5 illustrates one embodiment of an embossing device that may be employed to form the anisotropic material of the present invention.

In yet other embodiments, the polymeric material may be embossed to create local deformations by passing the material through a patterned roll against an anvil roll. When the deformed areas have been stressed to a level above the cavitational yield stress, these areas will form localized voided areas. Referring to FIG. 5, for example, one embodiment of an embossing system 300 is shown that can be used to provide the desired degree of local deformational strain. As depicted, a polymeric material 314 may be fed into a nip 360 formed between an anvil roll 320 containing a plurality of impression elements 350 and a backing roll 362. As the anvil roll 320 and the backing roll 362 rotate, the polymeric material 314 is fed into the nip and pressure is exerted thereon so that the material is selectively deformed at those regions contacted by the impression elements 350. In this particular embodiment, the impression elements 350 are disposed on outer portions of the anvil roll 320 such that the resulting material has a zoned configuration similar to shown in FIG. 2. Of course, this configuration is by no means required.

In the embodiments described above, the material is selectively strained within certain zones to help achieve the desired anisotropic properties. It should be understood that this is not necessarily required. In certain embodiments, for example, the entire polymeric material may be strained using known techniques, such as machine direction orientation, fiber aspiration, groove roll stretching, etc. In such embodiments, a porous network may be initially formed throughout the entire material. To achieve the selective and localized pore structure described above, however, the pores within certain regions (e.g., the second zone(s)) may be reduced in size using a heat treatment process. For example, the second zone(s) may be heated to a temperature at or above the glass transition temperature of the polymer matrix, such as at from about 40° to about 200° C., in some embodiments from about 50° C. to about 150° C., and in some embodiments, from about 70° C. to about 120° C. At such temperatures, the polymer can begin to flow and cause the pores to collapse upon themselves. Besides heating, other treatments may also be employed to achieve pore size reduction, such as the use of high energy beams (e.g., plasma, x-rays, e-beam, etc.).

Regardless of the particular technique employed, the degree to which the material is strained may be controlled to achieve the desired properties. Although the degree of strain may depend in part of the nature of the material being drawn (e.g., fiber or film), the material within a given zone is typically strained (e.g., in the machine direction) to a draw ratio of from about 1.1 to about 3.5, in some embodiments from about 1.2 to about 3.0, and in some embodiments, from about 1.3 to about 2.5. The draw ratio may be determined by dividing the length of the drawn material by its length before drawing. The draw rate may also vary to help achieve the desired properties, such as within the range of from about 5% to about 1500% per minute of deformation, in some embodiments from about 20% to about 1000% per minute of deformation, and in some embodiments, from about 25% to about 850% per minute of deformation. The material within the strained zone is generally kept at a temperature below the glass temperature of the matrix polymer and/or microinclusion additive during straining. Among other things, this helps to ensure that the polymer chains are not altered to such an extent that the porous network becomes unstable. For example, the material may be strained at a temperature that is at least about 10° C., in some embodiments at least about 20° C., and in some embodiments, at least about 30° C. below the glass transition temperature of the matrix polymer. For example, the material may be strained at a temperature of from about −50° C. to about 125° C., preferably from about −25° C. to about 100° C., and more preferably, from about −20° C. to about 50° C. Although the composition is typically strained without the application of external heat (e.g., heated rolls), such heat might be optionally employed to improve processability, reduce draw force, increase draw rates, and improve fiber uniformity.

Straining in the manner described above can result in the selective formation of pores that have a "nano-scale" dimension ("nanopores"), such as an average cross-sectional dimension of about 800 nanometers or less, in some embodiments from about 5 to about 250 nanometers, and in some embodiments, from about 10 to about 100 nanometers. Micropores may also be formed at and around the micro-scale domains during drawing that have an average cross-sectional dimension of from about 0.5 to about 30 micrometers, in some embodiments from about 1 to about 20 micrometers, and in some embodiments, from about 2 micrometers to about 15 micrometers. The micropores and/or nanopores may have any regular or irregular shape, such as spherical, elongated, etc. In certain cases, the axial dimension of the micropores and/or nanopores may be larger than the cross-sectional dimension so that the aspect ratio (the ratio of the axial dimension to the cross-sectional dimension) is from about 1 to about 30, in some embodiments from about 1.1 to about 15, and in some embodiments, from about 1.2 to about 5. The "axial dimension" is the dimension in the direction of the major axis (e.g., length), which is typically in the direction of drawing.

The present inventors have also discovered that the pores (e.g., micropores, nanopores, or both) can be distributed in a substantially homogeneous fashion throughout the strained zone(s). For example, the pores may be distributed in columns that are oriented in a direction generally perpendicular to the direction in which a stress is applied. These columns may be generally parallel to each other across the width of the strained zone(s). Without intending to be limited by theory, it is believed that the presence of such a homogeneously distributed porous network can result in good thermal and mechanical properties within the strained zone(s). This is in stark contrast to conventional techniques for creating pores that involve the use of blowing agents, which tend to result in an uncontrolled pore distribution and poor mechanical properties. Notably, the formation of the porous network by the process described above does not necessarily result in a substantial change in the cross-sectional size (e.g., width) of the material. In other words, the material is not substantially necked, which may allow the material to retain a greater degree of strength properties.

In addition to forming a porous network, straining can also significantly increase the axial dimension of the micro-scale domains so that they have a generally linear, elongated shape. For example, the elongated micro-scale domains within the strained zone(s) may have an axial dimension that is about 10% or more, in some embodiments from about 20% to about 500%, and in some embodiments, from about 50% to about 250% greater than the axial dimension of the domains prior to drawing. The average axial dimension after straining may, for instance, range from about 0.5 to about 250 micrometers, in some embodiments from about 1 to about 100 micrometers, in some embodiments from about 2 to about 50 micrometers, and in some embodiments, from about 5 to about 25 micrometers. The micro-scale domains within the strained zone(s) may also be relatively thin and thus have a small cross-sectional dimension. For instance, the cross-sectional dimension may be from about 0.05 to about 50 micrometers, in some embodiments from about 0.2 to about 10 micrometers, and in some embodiments, from 0.5 to about 5 micrometers. This may result in an aspect ratio for the micro-scale domains (the ratio of the axial dimension to the cross-sectional dimension) of from about 2 to about 150, in some embodiments from about 3 to about 100, and in some embodiments, from about 4 to about 50.

IV. Articles

The polymeric material of the present invention may generally have a variety of different forms depending on the particular application, such as films, fibrous materials, molded articles, profiles, etc., as well as composites and laminates thereof. In one embodiment, for example, the polymeric material is in the form of a film or layer of a film. Multilayer films may contain from two (2) to fifteen (15) layers, and in some embodiments, from three (3) to twelve (12) layers. Such multilayer films normally contain at least one base layer and at least one additional layer (e.g., skin layer), but may contain any number of layers desired. For example, the multilayer film may be formed from a base layer and one or more skin layers, wherein the base layer and/or skin layer(s) are formed from the polymeric material of the present invention. It should be understood, however, that other polymer materials may also be employed in the base layer and/or skin layer(s), such as polyolefin polymers.

The thickness of the film may be relatively small to increase flexibility. For example, the film may have a thickness of from about 1 to about 200 micrometers, in some embodiments from about 2 to about 150 micrometers, in some embodiments from about 5 to about 100 micrometers, and in some embodiments, from about 10 to about 60 micrometers.

In addition to a film, the polymeric material may also be in the form of a fibrous material or a layer or component of a fibrous material, which can include individual staple fibers or filaments (continuous fibers), as well as yarns, fabrics, etc. formed from such fibers. Yarns may include, for instance, multiple staple fibers that are twisted together ("spun yarn"), filaments laid together without twist ("zero-twist yarn"), filaments laid together with a degree of twist, single filament with or without twist ("monofilament"), etc. The yarn may or may not be texturized. Suitable fabrics may likewise include, for instance, woven fabrics, knit fabrics, nonwoven fabrics (e.g., spunbond webs, meltblown webs, bonded carded webs, wet-laid webs, airlaid webs, coform webs, hydraulically entangled webs, etc.), and so forth.

Fibers formed from the thermoplastic composition may generally have any desired configuration, including mono-component and multicomponent (e.g., sheath-core configuration, side-by-side configuration, segmented pie configuration, island-in-the-sea configuration, and so forth). In some embodiments, the fibers may contain one or more additional polymers as a component (e.g., bicomponent) or constituent (e.g., biconstituent) to further enhance strength and other mechanical properties. For instance, the thermoplastic composition may form a sheath component of a sheath/core bicomponent fiber, while an additional polymer may form the core component, or vice versa. The additional polymer may be a thermoplastic polymer such as polyesters, e.g., polylactic acid, polyethylene terephthalate, polybutylene terephthalate, and so forth; polyolefins, e.g., polyethylene, polypropylene, polybutylene, and so forth; polytetrafluoroethylene; polyvinyl acetate; polyvinyl chloride acetate; polyvinyl butyral; acrylic resins, e.g., polyacrylate, polymethylacrylate, polymethylmethacrylate, and so forth; polyamides, e.g., nylon; polyvinyl chloride; polyvinylidene chloride; polystyrene; polyvinyl alcohol; and polyurethanes.

Due to its unique ability to provide enhanced properties at those locations where they are most needed, the resulting anisotropic polymeric material of the present invention is well suited for use in a variety of different types of articles, such as an absorbent article, packaging film, barrier film, medical product (e.g., gown, surgical drape, facemask, head covering, surgical cap, shoe covering, sterilization wrap, warming blanket, heating pad, etc.), and so forth. For example, the polymeric material may be incorporated into an "absorbent article" that is capable of absorbing water or other fluids. Examples of some absorbent articles include, but are not limited to, personal care absorbent articles, such as diapers, training pants, absorbent underpants, incontinence articles, feminine hygiene products (e.g., sanitary napkins), swim wear, baby wipes, mitt wipe, and so forth; medical absorbent articles, such as garments, fenestration materials, underpads, bedpads, bandages, absorbent drapes, and medical wipes; food service wipers; clothing articles; pouches, and so forth. Materials and processes suitable for forming such articles are well known to those skilled in the art. Absorbent articles, for instance, typically include a substantially liquid-impermeable layer (e.g., outer cover), a liquid-permeable layer (e.g., bodyside liner, surge layer, etc.), and an absorbent core. In one embodiment, for example, the polymeric material may be in the form of a film that is used in an absorbent article, such as a liquid-impermeable film of the outer cover, which is either vapor-permeable. In such embodiments, selective zones of the film may be provided the desired breathability.

The polymeric material may also be employed in a wide variety of other types of articles. Non-limiting examples include, for instance, toys, insulation materials for refrigeration units (e.g., refrigerators, freezers, vending machines, etc.); automotive components (e.g., front and rear seats, headrests, armrests, door panels, rear shelves/package trays, steering wheels and interior trim, dashboards, etc.); building panels and sections (e.g., roofs, wall cavities, under floors, etc.); apparel (e.g., coats, shirts, pants, gloves, aprons, coveralls, shoes, boots, headwear, sock liners, etc.); furniture and bedding (e.g., sleeping bags, comforters, etc.); fluid storage/transfer systems (e.g., pipes or tankers for liquid/gas hydrocarbons, liquid nitrogen, oxygen, hydrogen, or crude oil); extreme environments (e.g., underwater or space); food and beverage products (e.g., cups, cup holders, plates, etc.); containers and bottles; and so forth. The polymeric material may also be used in a "garment", which is generally meant to include any article that is shaped to fit over a portion of a body. Examples of such articles include, without limitation, clothing (e.g., shirts, pants, jeans, slacks, skirts, coats, activewear, athletic, aerobic, and exercise apparel, swimwear, cycling jerseys or shorts, swimsuit/bathing suit, race suit, wetsuit, bodysuit, etc.), footwear (e.g., shoes, socks, boots, etc.), protective apparel (e.g., firefighter's coat), clothing accessories (e.g., belts, bra straps, side panels, gloves, hosiery, leggings, orthopedic braces, etc.), undergarments (e.g., underwear, t-shirts, etc.), compression garments, draped garments (e.g., kilts loincloths, togas, ponchos, cloaks, shawls, etc.), and so forth.

The polymeric material may be employed in a wide variety of articles within any particular application. For example, when considering automotive applications, the polymeric material may be employed in fibrous articles or as solid moldings. By way of example, fibers of the polymeric material may be beneficially employed in articles that can enhance comfort and/or aesthetics of a vehicle (e.g., coverings and/or paddings for sun visors, speaker housings and coverings, seat coverings, seal slip agents, and backings for seat coverings, carpeting and carpet reinforcement including carpet backing, car mats and backings for car mats, coverings for seat belts and seat belt anchorages, trunk floor coverings and liners, rear shelf panels, headliner facings and backings, upholstery backings, general decorative fabrics, etc.), materials that can provide general temperature and/or noise insulation (e.g., column padding, door trim pads, hood liners, general sound proofing and insulation materials, muffler wraps, bodywork parts, windows, saloon roofs, and sunroofs, tire reinforcements, etc.), and filtration/engine materials (e.g., fuel filters, oil filters, battery separators, cabin air filters, transmission tunnel materials, fuel tanks, etc.).

Solid moldings including the polymeric material can be utilized to enhance automotive safety components. For instance, the polymeric material can be encompassed in passive safety components such as crumple zones on the rear, front, and/or sides of a vehicle; within the safety cell of the automobile, as a component of the airbag or steering wheel (e.g., a collapsible steering column); as a cargo barrier; or as a component of a pedestrian safety system (e.g., as a component of the bumpers, hood, window frame, etc.).

The low density of the polymeric material can provide weight saving benefits in automotive applications. For example, the polymeric material can be a component of the structure of an automobile including, without limitation, the hood, bumpers and/or bumper supports, the trunk lid and/or compartment, and the underbody of the vehicle.

Such broad-based application of the polymeric material is applicable to a wide variety of fields, and is not intended to be in any way limited to the automotive industry. For instance, the polymeric material can be used in the transportation industry in any suitable application including, without limitation, air and space applications (e.g., airplanes, helicopters, space transports, military aerospace devices, etc.), marine applications (boats, ships, recreational vehicles), trains, and so forth. The polymeric material can be utilized in transportation applications in any desired fashion, e.g., in fibrous articles or solid moldings, in aesthetic applications, for temperature and/or noise insulation, in filtration and/or engine components, in safety components, etc.

The present invention may be better understood with reference to the following examples.

Test Methods

Water Vapor Transmission Rate ("WVTR"):

The test used to determine the WVTR of a material may vary based on the nature of the material. One technique for measuring the WVTR value is ASTM E96/96M-12, Procedure B. Another method involves the use of INDA Test Procedure IST-70.4 (01). The INDA test procedure is summarized as follows. A dry chamber is separated from a wet chamber of known temperature and humidity by a permanent guard film and the sample material to be tested. The purpose of the guard film is to define a definite air gap and to quiet or still the air in the air gap while the air gap is characterized. The dry chamber, guard film, and the wet chamber make up a diffusion cell in which the test film is sealed. The sample holder is known as the Permatran-W Model 100K manufactured by Mocon/Modern Controls, Inc., Minneapolis, Minn. A first test is made of the WVTR of the guard film and the air gap between an evaporator assembly that generates 100% relative humidity. Water vapor diffuses through the air gap and the guard film and then mixes with a dry gas flow that is proportional to water vapor concentration. The electrical signal is routed to a computer for processing. The computer calculates the transmission rate of the air gap and the guard film and stores the value for further use.

The transmission rate of the guard film and air gap is stored in the computer as CalC. The sample material is then sealed in the test cell. Again, water vapor diffuses through the air gap to the guard film and the test material and then mixes with a dry gas flow that sweeps the test material. Also, again, this mixture is carried to the vapor sensor. The computer then calculates the transmission rate of the combination of the air gap, the guard film, and the test material. This information is then used to calculate the transmission rate at which moisture is transmitted through the test material according to the equation:

$$TR^{-1}_{test\ material} = TR^{-1}_{test\ material,guardfilm,airgap} - TR^{-1}_{guardfilm,airgap}$$

The water vapor transmission rate ("WVTR") is then calculated as follows:

$$WVTR = \frac{F\rho_{sat(T)}RH}{AP_{sat(T)}(1-RH)}$$

wherein,

F=the flow of water vapor in $cm^3$ per minute;

$\rho_{sat(T)}$=the density of water in saturated air at temperature T;

RH=the relative humidity at specified locations in the cell;

A=the cross sectional area of the cell; and $P_{sat(T)}$=the saturation vapor pressure of water vapor at temperature T.

Conductive Properties:

Thermal conductivity (W/mK) and thermal resistance ($m^2$K/W) may be determined in accordance with ASTM E-1530-11 ("Resistance to Thermal Transmission of Materials by the Guarded Heat Flow Meter Technique") using an Anter Unitherm Model 2022 tester. The target test temperature may be 25° C. and the applied load may be 0.17 MPa. Prior to testing, the samples may be conditioned for 40+ hours at a temperature of 23° C. (±+2° C.) and relative humidity of 50% (+10%). Thermal admittance (W/$m^2$K) may also be calculated by dividing 1 by the thermal resistance.

Notched Charpy Impact Strength:

Impact strength may be determined in accordance with ASTM D6110-10 at a temperature of 23° C. or 0° C. (±2° C.), and at relative humidity of 50% (±10%). The sample may have a width of about 3.1 mm, the span may be 101.6 mm, and the depth under the notch may be about 10.2 mm. The pendulum may have a capacity of 2.7 Joules. Impact strength is calculated by dividing impact energy in kilojoules by the area under the notch (square meters) with higher numbers representing tougher materials.

Film Tensile Properties:

Films may be tested for tensile properties (peak stress, modulus, strain at break, and energy per volume at break) on a MTS Synergie 200 tensile frame. The test may be performed in accordance with ASTM D638-10 (at about 23° C.). Film samples may be cut into dog bone shapes with a center width of 3.0 mm before testing. The dog-bone film samples may be held in place using grips on the MTS Synergie 200 device with a gauge length of 18.0 mm. The film samples may be stretched at a crosshead speed of 5.0 in/min until breakage occurred. Five samples may be tested for each film in both the machine direction (MD) and the cross direction (CD). A computer program (e.g., TestWorks 4) may be used to collect data during testing and to generate a stress versus strain curve from which a number of properties may be determined, including modulus, peak stress, elongation, and energy to break.

Melt Flow Rate:

The melt flow rate ("MFR") is the weight of a polymer (in grams) forced through an extrusion rheometer orifice (0.0825-inch diameter) when subjected to a load of 2160 grams in 10 minutes, typically at 190° C., 210° C., or 230° C. Unless otherwise indicated, melt flow rate is measured in accordance with ASTM Test Method D1239 with a Tinius Olsen Extrusion Plastometer.

Thermal Properties:

The glass transition temperature ($T_g$) may be determined by dynamic mechanical analysis (DMA) in accordance with ASTM E1640-09. A Q800 instrument from TA Instruments may be used. The experimental runs may be executed in tension/tension geometry, in a temperature sweep mode in the range from −120° C. to 150° C. with a heating rate of 3° C./min. The strain amplitude frequency may be kept constant (2 Hz) during the test. Three (3) independent samples may be tested to get an average glass transition temperature, which is defined by the peak value of the tan δ curve, wherein tan δ is defined as the ratio of the loss modulus to the storage modulus (tan δ=E"/E').

The melting temperature may be determined by differential scanning calorimetry (DSC). The differential scanning calorimeter may be a DSC Q100 Differential Scanning Calorimeter, which may be outfitted with a liquid nitrogen cooling accessory and with a UNIVERSAL ANALYSIS 2000 (version 4.6.6) analysis software program, both of which are available from T.A. Instruments Inc. of New Castle, Del. To avoid directly handling the samples, tweezers or other tools may be used. The samples may be placed into an aluminum pan and weighed to an accuracy of 0.01 milligram on an analytical balance. A lid may be crimped over the material sample onto the pan. Typically, the resin pellets may be placed directly in the weighing pan.

The differential scanning calorimeter may be calibrated using an indium metal standard and a baseline correction may be performed, as described in the operating manual for the differential scanning calorimeter. A material sample may be placed into the test chamber of the differential scanning calorimeter for testing, and an empty pan may be used as a reference. All testing may be run with a 55-cubic centimeter per minute nitrogen (industrial grade) purge on the test chamber. For resin pellet samples, the heating and cooling program is a 2-cycle test that began with an equilibration of the chamber to −30° C., followed by a first heating period at a heating rate of 10° C. per minute to a temperature of 200° C., followed by equilibration of the sample at 200° C. for 3 minutes, followed by a first cooling period at a cooling rate of 10° C. per minute to a temperature of −30° C., followed by equilibration of the sample at −30° C. for 3 minutes, and then a second heating period at a heating rate of 10° C. per minute to a temperature of 200° C. For fiber samples, the heating and cooling program may be a 1-cycle test that begins with an equilibration of the chamber to −25° C., followed by a heating period at a heating rate of 10° C. per minute to a temperature of 200° C., followed by equilibration of the sample at 200° C. for 3 minutes, and then a cooling period at a cooling rate of 10° C. per minute to a temperature of −30° C. All testing may be run with a 55-cubic centimeter per minute nitrogen (industrial grade) purge on the test chamber.

The results may be evaluated using the UNIVERSAL ANALYSIS 2000 analysis software program, which identifies and quantifies the glass transition temperature ($T_g$) of inflection, the endothermic and exothermic peaks, and the areas under the peaks on the DSC plots. The glass transition temperature may be identified as the region on the plot-line where a distinct change in slope occurred, and the melting temperature may be determined using an automatic inflection calculation.

Density and Percent Pore Volume:

To determine density and percent pore volume, the width ($W_i$) and thickness ($T_i$) of the specimen may be initially measured prior to drawing. The length ($L_i$) before drawing may also be determined by measuring the distance between two markings on a surface of the specimen. Thereafter, the specimen may be drawn to initiate voiding. The width ($W_f$), thickness ($T_f$), and length ($L_f$) of the specimen may then be measured to the nearest 0.01 mm utilizing Digimatic Caliper (Mitutoyo Corporation). The volume ($V_i$) before drawing may be calculated by $W_i \times T_i \times L_i = V_i$. The volume ($V_f$) after drawing may also be calculated by $W_f \times T_f \times L_f = V_f$. The density ($P_f$) may be calculated by: $P_f = P_i/\varphi$, where $P_i$ is density of precursor material, and the percent pore volume (% $V_v$) may be calculated by: % $V_v = (1-1/\varphi) \times 100$. To determine the density of a zone, as described below, a disc-shaped sample (diameter of 1.3 cm) may be cut out from a material and then weighed using standard measuring weights.

Moisture Content:

Moisture content may be determined using an Arizona Instruments Computrac Vapor Pro moisture analyzer (Model No. 3100) in substantial accordance with ASTM D 7191-05, which is incorporated herein in its entirety by reference thereto for all purposes. The test temperature (§X2.1.2) may be 130° C., the sample size (§X2.1.1) may be 2 to 4 grams, and the vial purge time (§X2.1.4) may be 30 seconds. Further, the ending criteria (§X2.1.3) may be defined as a "prediction" mode, which means that the test is ended when the built-in programmed criteria (which mathematically calculates the end point moisture content) is satisfied.

Example 1

The ability to create a unique porous network within a polymeric material was demonstrated. Initially, a thermoplastic composition was formed from 85.3 wt. % polylactic acid (PLA 6201D, Natureworks®), 9.5 wt. % of a microinclusion additive, 1.4 wt. % of a nanoinclusion additive, and 3.8 wt. % of an internal interfacial modifier. The microinclusion additive was Vistamaxx™ 2120 (ExxonMobil), which is a polypropylene-polyethylene copolymer elastomer with a melt flow rate of 29 g/10 min (190° C., 2160 g) and a density of 0.866 g/cm³. The nanoinclusion additive was poly(ethylene-co-methyl acrylate-co-glycidyl methacrylate) (Lotader® AX8900, Arkema) having a melt flow rate of 5-6 g/10 min (190° C./2160 g), a glycidyl methacrylate content of 7 to 11 wt. %, methyl acrylate content of 13 to 17 wt. %, and ethylene content of 72 to 80 wt. %. The internal interfacial modifier was PLURIOL® WI 285 Lubricant from BASF, which is a polyalkylene glycol functional fluid.

The polymers were fed into a co-rotating, twin-screw extruder (ZSK-30, diameter of 30 mm, length of 1328 millimeters) for compounding that was manufactured by Werner and Pfleiderer Corporation of Ramsey, N.J. The extruder possessed 14 zones, numbered consecutively 1-14 from the feed hopper to the die. The first barrel zone #1 received the resins via gravimetric feeder at a total throughput of 15 pounds per hour. The PLURIOL® WI285 was added via injector pump into barrel zone #2. The die used to extrude the resin had 3 die openings (6 millimeters in diameter) that were separated by 4 millimeters. Upon formation, the extruded resin was cooled on a fan-cooled conveyor belt and formed into pellets by a Conair pelletizer. The extruder screw speed was 200 revolutions per minute ("rpm"). The pellets were then flood fed into a signal screw extruder heated to a temperature of 212° C. where the molten blend exited through 4.5 inch width slit die and drawn to a film thickness ranging from 36 µm to 54 µm. The films were stretched in the machine direction to about 100% to initiate cavitation and void formation.

Figure 6:
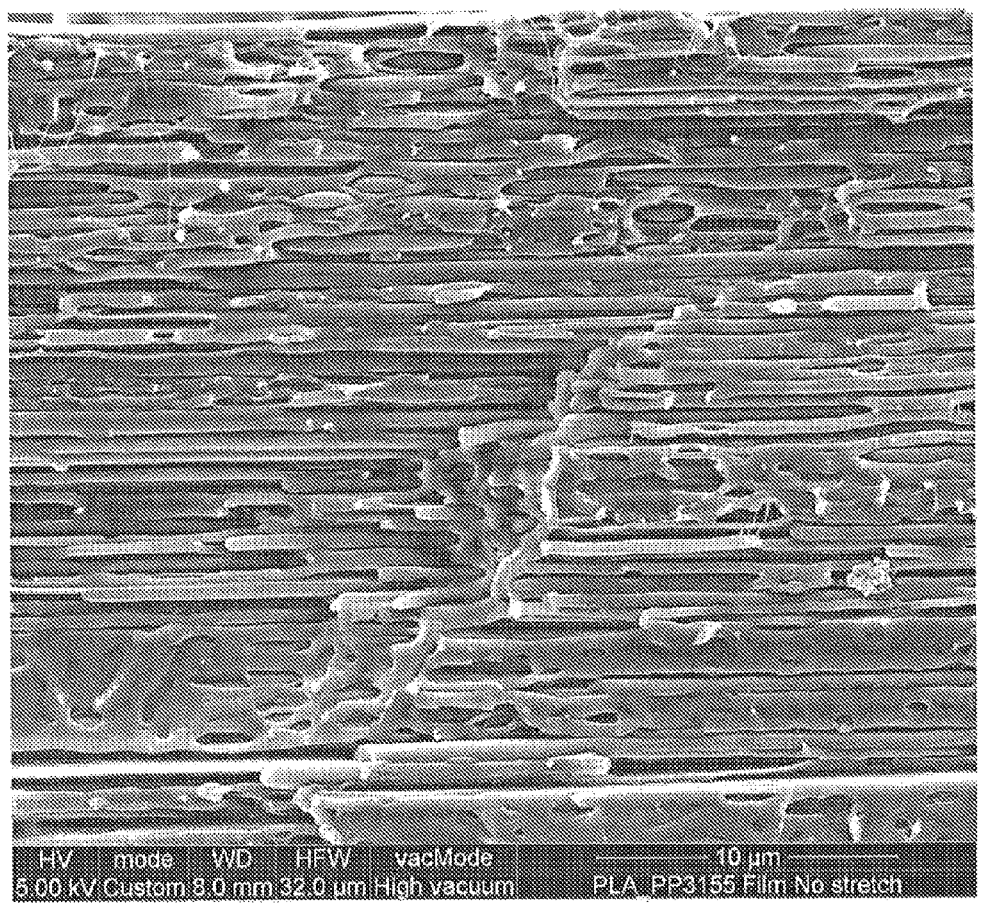
FIGS. 6-7 are SEM microphotographs of the unstretched film of Example 1, where the film was cut perpendicular to the machine direction in FIG. 6 and parallel to the machine direction in FIG. 7.
Figure 7:
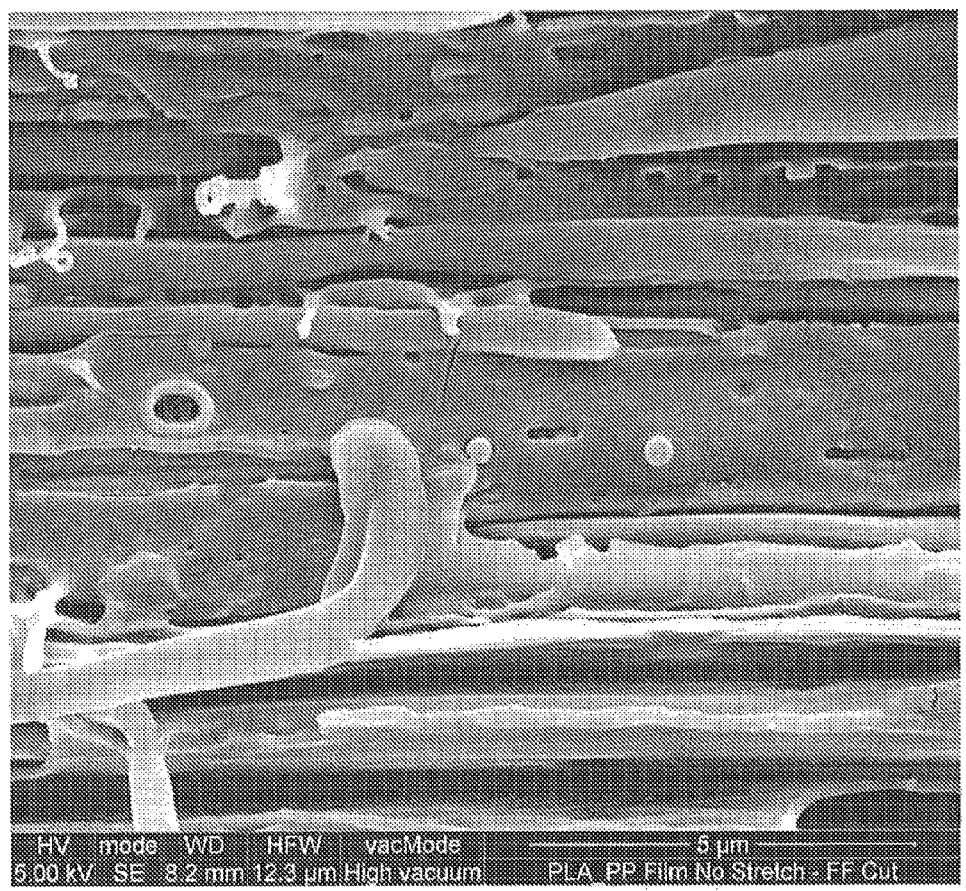
Figure 8:
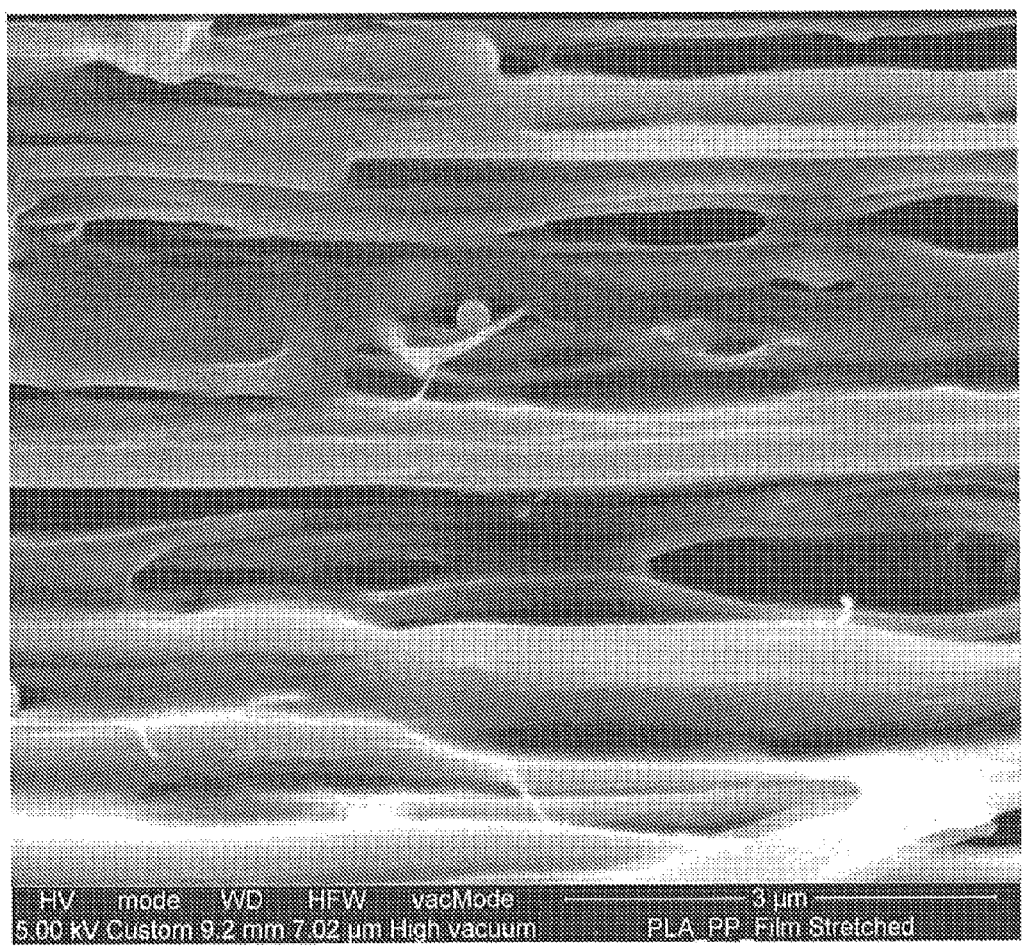
FIGS. 8-9 are SEM microphotographs of the stretched film of Example 1 (film was cut parallel to machine direction orientation).
Figure 9:
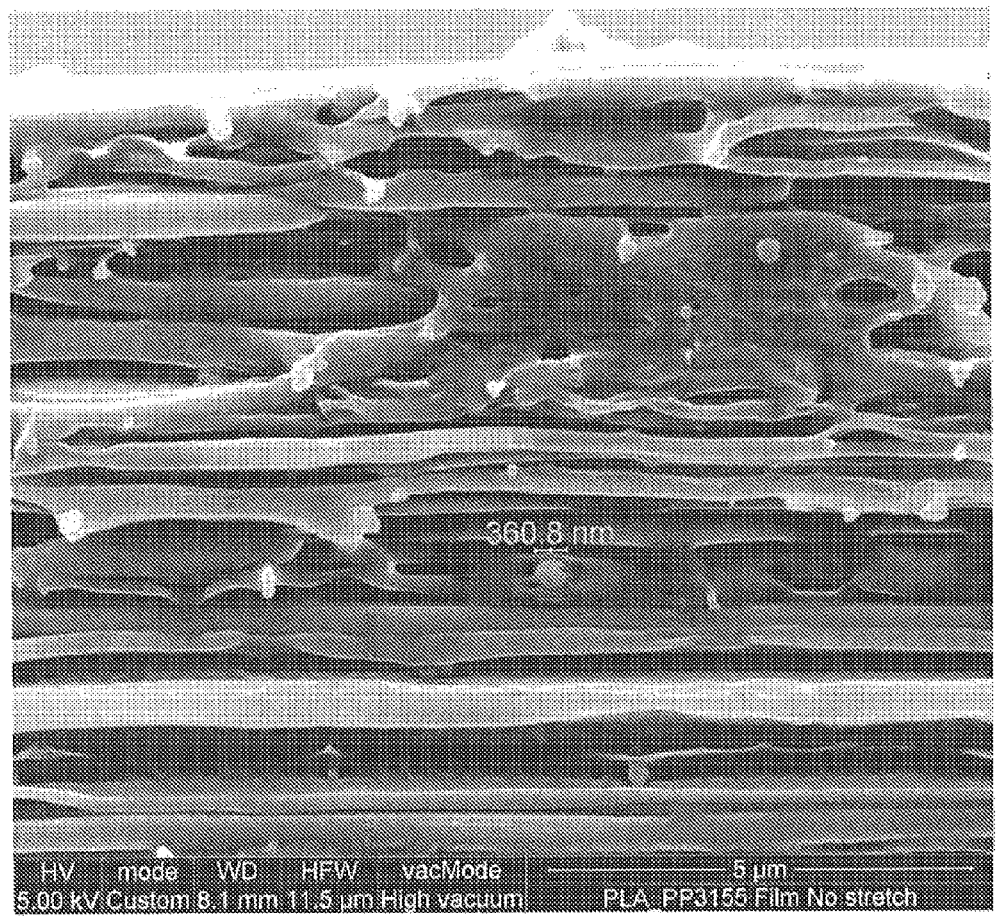

The morphology of the films was analyzed by scanning electron microscopy (SEM) before and after stretching. The results are shown in FIGS. 6-9. As shown in FIGS. 6-7, the microinclusion additive was initially dispersed in domains having an axial size (in machine direction) of from about 2 to about 30 micrometers and a transverse dimension (in cross-machine direction) of from about 1 to about 3 micrometers, while the nanoinclusion additive was initially dispersed as spherical or spheroidal domains having an axial size of from about 100 to about 300 nanometers. FIGS. 8-9 show the film after stretching. As indicated, pores formed around the inclusion additives. The micropores formed around the microinclusion additive generally had an elongated or slit-like shape with a broad size distribution ranging from about 2 to about 20 micrometers in the axial direction. The nanopores associated with the nanoinclusion additive generally had a size of from about 50 to about 500 nanometers.

Example 2

The compounded pellets of Example 1 were dry blended with a third inclusion additive, which was a halloisite clay masterbatch (MacroComp MNH-731-36, MacroM) containing 22 wt. % of a styrenic copolymer modified nanoclay and 78 wt. % polypropylene (Exxon Mobil 3155). The mixing ratio was 90 wt. % of the pellets and 10 wt. % of the clay masterbatch, which provided a total clay content of 2.2%. The dry blend was then flood fed into a signal screw extruder heated to a temperature of 212° C., where the molten blend exited through 4.5 inch width slit die and drawn to a film thickness ranging from 51 to 58 µm. The films were stretched in the machine direction to about 100% to initiate cavitation and void formation.

Figure 10:
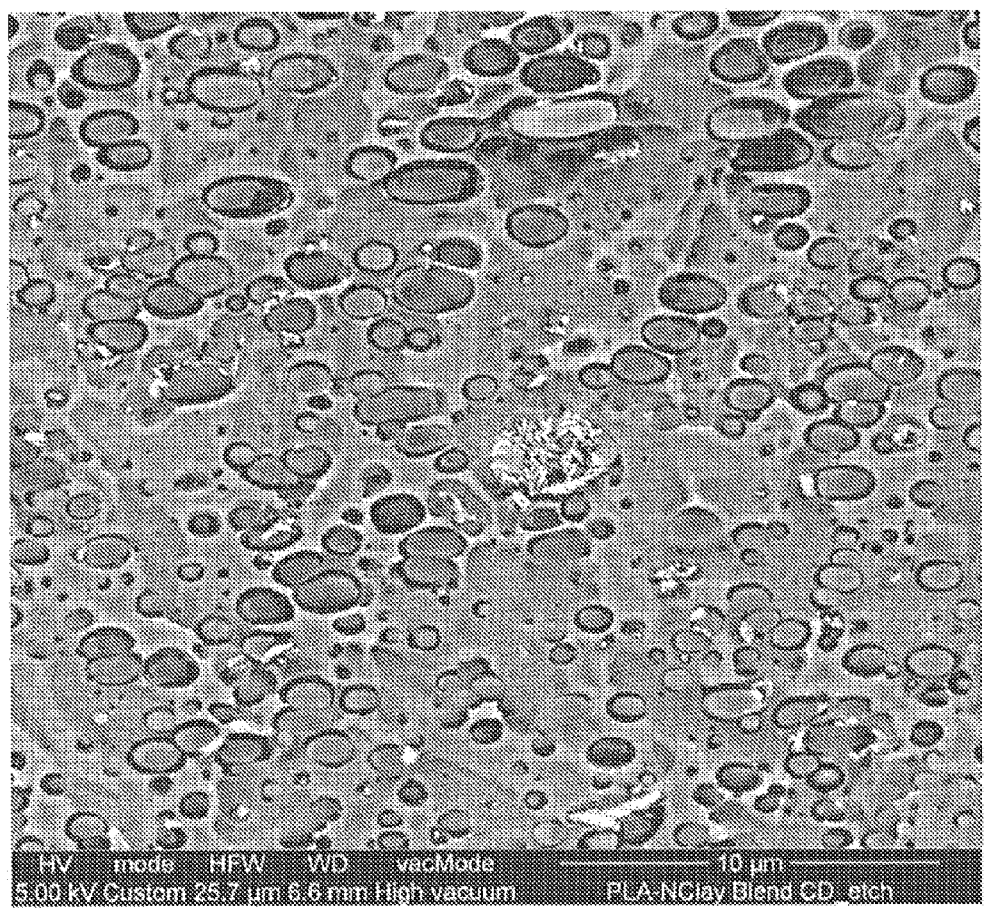
FIGS. 10-11 are SEM microphotographs of the unstretched film of Example 2, where the film was cut perpendicular to the machine direction in FIG. 10 and parallel to the machine direction in FIG. 11.
Figure 11:
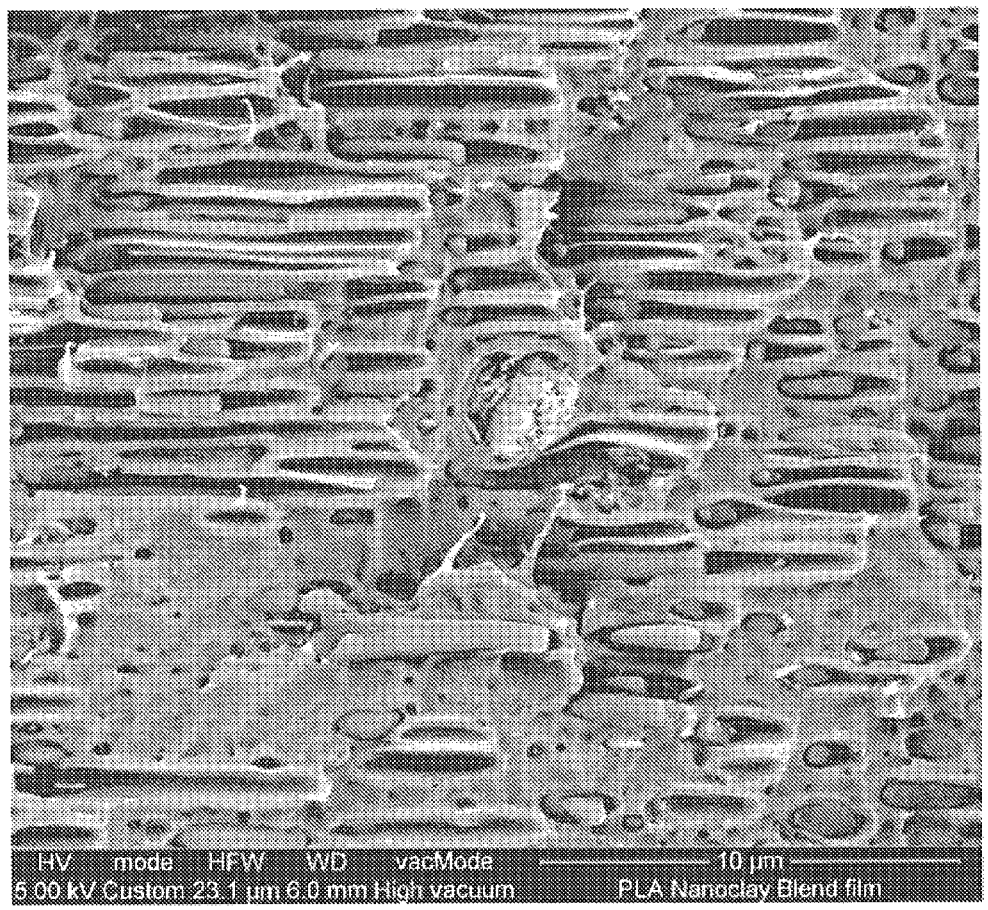
Figure 12:
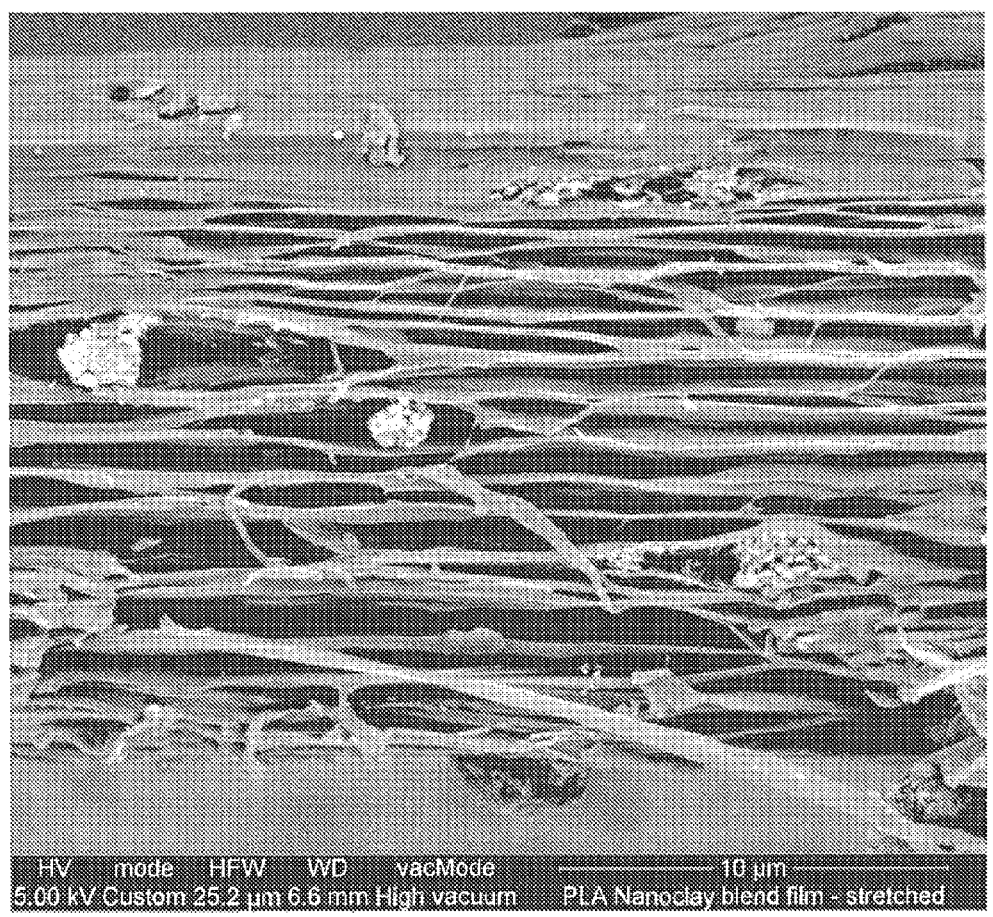
FIGS. 12-13 are SEM microphotographs of the stretched film of Example 2 (film was cut parallel to machine direction orientation).
Figure 13:
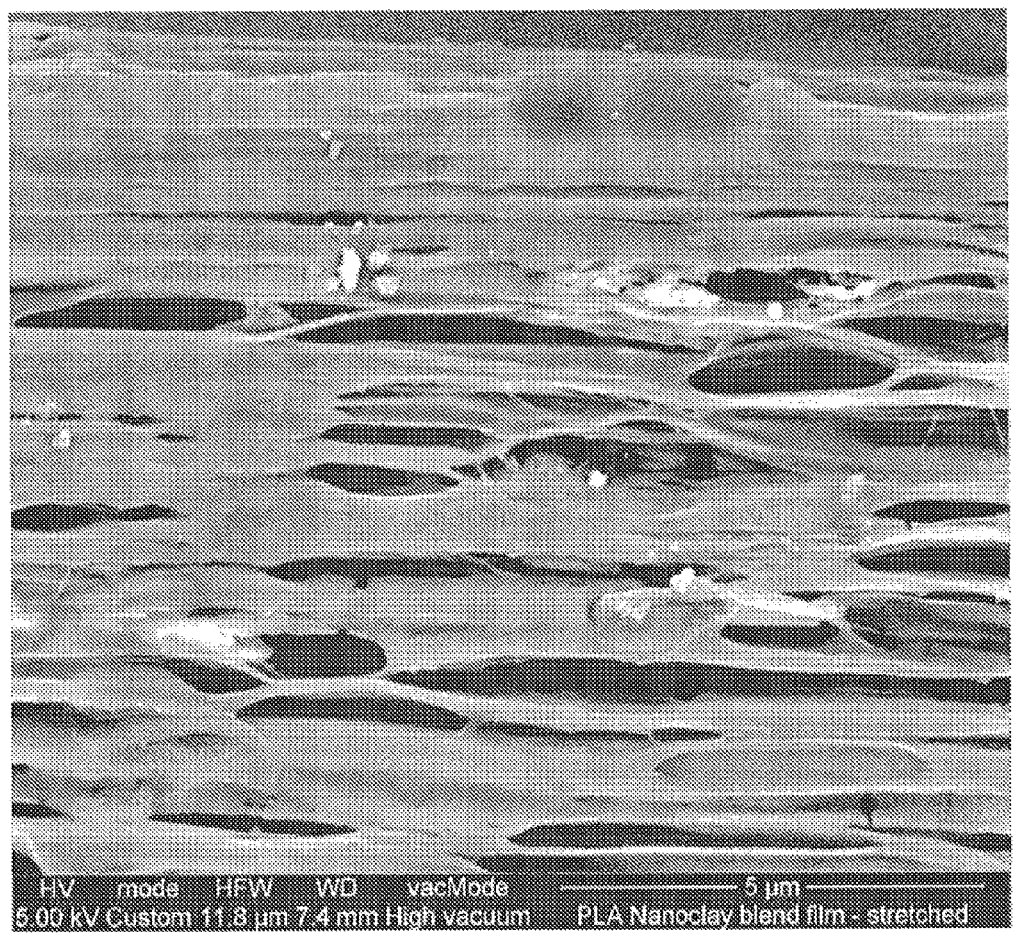

The morphology of the films was analyzed by scanning electron microscopy (SEM) before and after stretching. The results are shown in FIGS. 10-13. As shown in FIGS. 10-11, some of the nanoclay particles (visable as brighter regions) became dispersed in the form of very small domains—i.e., axial dimension ranging from about 50 to about 300 nanometers. The masterbatch itself also formed domains of a micro-scale size (axial dimension of from about 1 to about 5 micrometers). Also, the microinclusion additive (Vistamax™) formed elongated domains, while the nanoinclusion additive (Lotader®, visible as ultrafine dark dots) and the nanoclay masterbatch formed spheroidal domains. The stretched film is shown in FIGS. 12-13. As shown, the voided structure is more open and demonstrates a broad variety of pore sizes. In addition to highly elongated micropores formed by the first inclusions (Vistamaxx™), the nanoclay masterbatch inclusions formed more open spheroidal micropores with an axial size of about 10 microns or less and a transverse size of about 2 microns. Spherical nanopores are also formed by the second inclusion additive (Lotader®) and third inclusion additive (nanoclay particles).

Example 3

The ability to create a polymeric material having unique properties was demonstrated. Initially, a blend of 85.3 wt. % PLA 6201 D, 9.5 wt. % of Vistamaxx™ 2120, 1.4 wt. % of Lotader® AX8900, and 3.8 wt. % of PLURIOL® WI 285 was formed. The polymers were fed into a co-rotating, twin-screw extruder (ZSK-30, diameter of 30 mm, length of 1328 millimeters) for compounding that was manufactured by Werner and Pfleiderer Corporation of Ramsey, N.J. The extruder possessed 14 zones, numbered consecutively 1-14 from the feed hopper to the die. The first barrel zone #1 received the resins via gravimetric feeder at a total throughput of 15 pounds per hour. The PLURIOL® WI285 was added via injector pump into barrel zone #2. The die used to extrude the resin had 3 die openings (6 millimeters in diameter) that were separated by 4 millimeters. Upon formation, the extruded resin was cooled on a fan-cooled conveyor belt and formed into pellets by a Conair pelletizer. The extruder screw speed was 200 revolutions per minute ("rpm"). The pellets were then flood fed into a signal screw extruder heated to a temperature of 212° C. where the molten blend exited through 4.5 inch width slit die and drawn to a film thickness ranging from 0.54 to 0.58 mm.

Example 4

The sheet produced in Example 3 was cut to a 6" length and then drawn to 100% elongation using a MTS 820 hydraulic tensile frame in tensile mode at 50 mm/min.

Example 5

The sheet produced in Example 3 was cut to a 6" length and then drawn to 150% elongation using a MTS 820 hydraulic tensile frame in tensile mode at 50 mm/min.

Example 6

The sheet produced in Example 3 was cut to a 6" length and then drawn to 200% elongation using a MTS 820 hydraulic tensile frame in tensile mode at 50 mm/min. The thermal properties of Examples 3-6 were then determined. The results are set forth in the table below.

| Example | Sample Thickness (mm) | Upper Surface Temp. (° C.) | Lower Surface Temp (° C.) | Heat Sink Temp (° C.) | Mean Sample Temp (° C.) | Thermal Resistance (m²K/W) | Thermal Admittance (W/m²K) | Thermal Conductivity (W/mK) |
|---|---|---|---|---|---|---|---|---|
| 3 | 0.58 | 40.5 | 30.0 | 11.3 | 35.3 | 0.0032 | 312.5 | 0.180 |
| 4 | 0.54 | 40.5 | 26.4 | 10.3 | 33.5 | 0.0054 | 185.2 | 0.100 |
| 5 | 0.57 | 40.5 | 26.1 | 10.3 | 33.3 | 0.0057 | 175.4 | 0.100 |
| 6 | 0.56 | 40.5 | 25.1 | 10.0 | 32.8 | 0.0064 | 156.3 | 0.087 |

Example 7

Pellets were formed as described in Example 3 and then flood fed into a Rheomix 252 single screw extruder with a L/D ratio of 25:1 and heated to a temperature of 212° C. where the molten blend exited through a Haake 6 inch width s cast film die and drawn to a film thickness ranging from 39.4 µm to 50.8 µm via Haake take-up roll. The film was drawn in the machine direction to a longitudinal deformation of 160% at a pull rate of 50 mm/min (deformation rate of 67%/min) via MTS Synergie 200 tensile frame with grips at a gage length of 75 mm.

Example 8

Films were formed as described in Example 7, except that the film was also stretched in the cross-machine direction to a deformation of 100% at a pull rate of 50 mm/min (deformation rate of 100%/min) with grips at a gage length of 50 mm. Various properties of the films of Examples 7-8 were tested as described above. The results are set forth below in the tables below.

| | Film Properties | | | | |
|---|---|---|---|---|---|
| Ex. | Average Thickness (µm) | Expansion Ratio (φ) | Percent Void Volume (% $V_v$) | Density (g/cm$^3$) | WVTR (g/m$^2$*24 hrs.) |
| 7 | 41.4 | 1.82 | 45 | 0.65 | 5453 |
| 8 | 34.0 | 2.13 | 53 | 0.56 | 4928 |

| | | Tensile Properties | | | | |
|---|---|---|---|---|---|---|
| Example | | Avg. Thickness (µm) | Avg. Modulus (MPa) | Avg. Yield Stress (MPa) | Avg. Break Stress (MPa) | Avg. Strain at Break (%) | Avg. Energy per Volume at Break (J/cm$^3$) |
| 7 | MD | 44.5 | 466 | 41.4 | 36.9 | 54.6 | 16.8 |
|   | CD | 40.4 | 501 | 15.9 | 15.9 | 62.6 | 9.4 |
| 8 | MD | 37.3 | 265 | 26.7 | 26.3 | 85.5 | 15.8 |
|   | CD | 34.3 | 386 | 25.1 | 25.2 | 45.8 | 9.3 |

Example 9

The ability to create a material having a high degree of impact strength within a polymeric material was demonstrated. Initially, a thermoplastic composition was formed from 85.3 wt. % PLA 6201 D, 9.5 wt. % of Vistamaxx™ 2120, 1.4 wt. % of Lotader® AX8900, and 3.8 wt. % of PLURIOL® WI 285. The polymers were fed into a co-rotating, twin-screw extruder (ZSK-30, diameter of 30 mm, length of 1328 millimeters) for compounding that was manufactured by Werner and Pfleiderer Corporation of Ramsey, N.J. The extruder possessed 14 zones, numbered consecutively 1-14 from the feed hopper to the die. The first barrel zone #1 received the resins via gravimetric feeder at a total throughput of 15 pounds per hour. The PLURIOL® WI285 was added via injector pump into barrel zone #2. The die used to extrude the resin had 3 die openings (6 millimeters in diameter) that were separated by 4 millimeters. Upon formation, the extruded resin was cooled on a fan-cooled conveyor belt and formed into pellets by a Conair pelletizer. The extruder screw speed was 200 revolutions per minute ("rpm"). The pellets were then fed to into an injection molder (Boy 22D) and injected into an ASTM test mold to create bars with a thickness of 3 mm, width of 12.7 mm and length of 127 mm. The bars were then elongated to 60% to initiate cavitation and void formation (speed of 50 millimeters per minute) using a MTS 810 hydraulic tensile frame. The bars were then trimmed back to the −127 mm length to remove the non-voided portion of the bar.

Once formed, the material was subjected to a notched Charpy impact resistance test in accordance with ASTM D6110-10 to determine the Charpy impact strength (kJ/m$^2$). The tests were conducted at a temperature of 23° C. and 0° C. Control samples were also tested that were made from a acrylonitrile-butadiene-styrene copolymer (Terluran® GP-22, BASF) ("Control Sample 1") and a medium impact polypropylene-copolymer (Pro-Fax™ SV954, Basell) ("Control Sample 2"). The results are set forth below in the table below.

| | Impact Strength | | | |
|---|---|---|---|---|
| Example | Avg. Charpy Impact Strength at 23° C. (J/m) | Avg. Charpy Impact Strength at 23° C. (kJ/m$^2$) | Avg. Charpy Impact Strength at 0° C. (J/m) | Avg. Charpy Impact Strength at 0° C. (kJ/m$^2$) |
| 9 | 545 | 53.70 | 320 | 31.40 |
| Control 1 | 193 | 19.00 | 132 | 12.90 |
| Control 2 | 85 | 8.37 | 31 | 3.02 |

Example 10

A film (thickness of 50 micrometers) was formed from the composition of Example 1. The film was separated into six (6) contiguous zones. Every other zone was stretched to elongational deformation strain rates of 50%, 100%, and 200%, respectively, using an MTS Synergie tensile frame so that the three (3) stretched zones were each located adjacent to an unstretched zone. The tensile properties and density were then determined in the stretched zones of the anisotropic film, and compared to the properties of an unstretched zone. The results are set forth in the table below.

| | Density (g/cm³) | Ratio of Stretched to Unstretched Density | Avg. Strain at Break (%) | Ratio of Stretched to Unstretched Strain at Break | Avg. Modulus (MPa) | Ratio of Stretched to Unstretched Modulus | Avg. Break Stress (MPa) | Ratio of Stretched to Unstretched Break Stress |
|---|---|---|---|---|---|---|---|---|
| Unstretched | 1.11 | — | 137.5 | — | 2433.3 | — | 35.6 | — |
| Stretched 50% | 0.93 | 0.84 | 101.5 | 0.7 | 695.2 | 0.3 | 39.5 | 1.1 |
| Stretched 100% | 0.75 | 0.68 | 75.5 | 0.5 | 765.8 | 0.3 | 40.5 | 1.1 |
| Stretched 150% | 0.60 | 0.54 | 40.9 | 0.3 | 707.2 | 0.3 | 41.8 | 1.2 |

As indicated, zoned stretching of the film can create an anisotropic material having a significantly different density, tensile modulus, and strain at break.

Example 11

Three (3) samples of the stretched and voided films of Example 1 were formed to a density of 0.60 g/cm³. These films were subjected to heat treatment at a temperature of 40° C., 60° C., and 90° C., respectively. The tensile properties and density were then determined and compared to the properties of the film prior to heat treatment. The results are set forth in the table below.

| Heat Treatment | Density (g/cm³) | Ratio of Unheated to Heated Density | Avg. Strain at Break (%) | Ratio of Unheated to Heated Strain at Break | Avg. Modulus (MPa) | Ratio of Unheated to Heated Modulus | Avg. Break Stress (MPa) | Ratio of Unheated to Heated Break Stress |
|---|---|---|---|---|---|---|---|---|
| — | 0.60 | — | 60 | — | 898 | — | 39.4 | — |
| 40° C. | 0.62 | 0.96 | 59 | 1.02 | 889 | 0.99 | 39.5 | 1.00 |
| 60° C. | 0.77 | 0.78 | 76 | 0.79 | 1263 | 0.71 | 44.5 | 0.88 |
| 90° C. | 0.86 | 0.70 | 91 | 0.66 | 1467 | 0.61 | 46.2 | 0.85 |

Example 12

Three (3) samples of the stretched and voided films of Example 1 were formed to a density of 0.72 g/cm³. These films were subjected to heat treatment at a temperature of 40° C., 60° C., and 90° C., respectively. The tensile properties and density were then determined and compared to the properties of the film prior to heat treatment. The results are set forth in the table below.

| Heat Treatment | Density (g/cm³) | Ratio of Unheated to Heated Density | Avg. Strain at Break (%) | Ratio of Unheated to Heated Strain at Break | Avg. Modulus (MPa) | Ratio of Unheated to Heated Modulus | Avg. Break Stress (MPa) | Ratio of Unheated to Heated Break Stress |
|---|---|---|---|---|---|---|---|---|
| — | 0.72 | — | 78 | — | 975 | — | 38.2 | — |
| 40° C. | 0.73 | 0.99 | 74 | 1.05 | 987 | 0.99 | 39.8 | 0.96 |
| 60° C. | 0.85 | 0.85 | 64 | 0.82 | 1191 | 0.82 | 42.7 | 0.89 |
| 90° C. | 0.98 | 0.73 | 88 | 1.13 | 1594 | 0.61 | 45.0 | 0.85 |

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A polymeric material, wherein the polymeric material is formed from a thermoplastic composition containing a continuous phase that includes a matrix polymer, and further wherein a microinclusion additive and nanoinclusion additive are dispersed within the continuous phase in the form of discrete domains, wherein the polymeric material defines a first zone that is contiguous to a second zone, wherein a porous network is formed within the first zone such that the first zone exhibits a greater pore volume than the second zone.

2. The polymeric material of claim 1, wherein the average pore volume of the material within the first zone is from about 15% to about 80% per cm³.

3. The polymeric material of claim 2, wherein the average pore volume of the material within the second zone is less than 15%.

4. The polymeric material of claim 1, wherein the ratio of the density of the material within the first zone to the density of the material within the second zone is from about 0.1 to about 0.95.

5. The polymeric material of claim 1, wherein the density of the material within the first zone is about 1.2 g/cm³ or less.

6. The polymeric material of claim 1, wherein the ratio of the water vapor transmission rate of the material within the first zone to the water vapor transmission rate of the material within the second zone is from about 0.1 to about 0.95.

7. The polymeric material of claim 1, wherein the water vapor transmission rate of the material within the first zone is about 500 g/m$^2$-24 hours or more.

8. The polymeric material of claim 1, wherein the ratio of the modulus of elasticity of the material within the first zone to the modulus of elasticity of the material within the second zone is from about 0.1 to about 0.95.

9. The polymeric material of claim 1, wherein the modulus of elasticity of the material within the first zone is about 2400 MPa or less.

10. The polymeric material of claim 1, wherein the ratio of the notched Charpy impact strength of the material within the first zone to the notched Charpy impact strength of the material within the second zone is from about 0.1 to about 0.95.

11. The polymeric material of claim 1, wherein the notched Charpy impact strength within the first zone is about 10 kJ/m$^2$ or more.

12. The polymeric material of claim 1, wherein the ratio of the thermal admittance of the material within the first zone to the thermal admittance of the material within the second zone is from about 0.1 to about 0.95.

13. The polymeric material of claim 1, wherein the thermal admittance within the first zone is about 1000 W/m$^2$K or less.

14. The polymeric material of claim 1, wherein the porous network includes a plurality of nanopores having an average cross-sectional dimension of about 800 nanometers or less.

15. The polymeric material of claim 14, wherein the nanopores constitute about 20 vol. % or more of the total pore volume of the material within the first zone.

16. The polymeric material of claim 15, wherein the porous network further includes micropores.

17. The polymeric material of claim 16, wherein the aspect ratio of the micropores is from about 1 to about 30.

18. The polymeric material of claim 1, wherein the continuous phase constitutes from about 60 wt. % to about 99 wt. % of the thermoplastic composition.

19. The polymeric material of claim 1, wherein the matrix polymer includes a polyester or polyolefin.

20. The polymeric material of claim 19, wherein the polyester has a glass transition temperature of about 0° C. or more.

21. The polymeric material of claim 19, wherein the polyester includes polylactic acid.

22. The polymeric material of claim 1, wherein the microinclusion additive is polymeric.

23. The polymeric material of claim 22, wherein the microinclusion additive includes a polyolefin.

24. The polymeric material of claim 1, wherein the ratio of the solubility parameter for the matrix polymer to the solubility parameter of the microinclusion additive is from about 0.5 to about 1.5, the ratio of the melt flow rate for the matrix polymer to the melt flow rate of the microinclusion additive is from about 0.2 to about 8, and/or the ratio of the Young's modulus elasticity of the matrix polymer to the Young's modulus of elasticity of the microinclusion additive is from about 1 to about 250.

25. The polymeric material of claim 1, wherein the nanoinclusion additive is a functionalized polyolefin.

26. The polymeric material of claim 25, wherein the nanoinclusion additive is a polyepoxide.

27. The polymeric material of claim 1, wherein the microinclusion additive constitutes from about 1 wt. % to about 30 wt. % of the composition, based on the weight of the continuous phase.

28. The polymeric material of claim 1, wherein the nanoinclusion additive constitutes from about 0.05 wt. % to about 20 wt. % of the composition, based on the weight of the continuous phase.

29. The polymeric material of claim 1, wherein the thermoplastic composition further comprises an interphase modifier.

30. The polymeric material of claim 1, wherein the material defines multiple first zones, multiple second zones, or a combination thereof, at least one of the first zones being contiguous to at least one of the second zones.

31. The polymeric material of claim 1, wherein a second zone is positioned between two first zones.

32. A method for forming the polymeric material of claim 1, the method comprising straining the first zone of the polymeric material to achieve the porous network.

33. The method of claim 32, wherein the second zone is not strained.

34. The method of claim 32, wherein the second zone is strained to a lesser degree than the first zone.

35. The method of claim 32, wherein the second zone are strained and thereafter subjected to a heat treatment.

36. The method of claim 32, wherein the first zone is strained at a temperature of from about −50° C. to about 125° C.

37. The method of claim 32, wherein the first zone is strained at a temperature that is at least about 10° C.

* * * * *